(12) United States Patent
O'Donnell et al.

(10) Patent No.: US 11,965,794 B2
(45) Date of Patent: Apr. 23, 2024

(54) SYSTEM FOR WIRELESS AND PASSIVE MONITORING OF STRAIN DURING MANUFACTURING PROCESSES

(71) Applicant: THE PROVOST, FELLOWS, FOUNDATION SCHOLARS, & THE OTHER MEMBERS OF BOARD, OF THE COLLEGE OF THE HOLY & UNDIV. TRINITY OF QUEEN ELIZABETH NEAR DUBLIN, Dublin (IE)

(72) Inventors: Garrett O'Donnell, Trim (IE); Sean Patrick Nolan, Nenagh (IE)

(73) Assignee: The Provost, Fellows, Foundation Scholars, & the other members of Board, of the College of the Holy & Undiv. Trinity of Queen Elizabeth Near Dublin, Dublin (IE)

( * ) Notice: Subject to any disclaimer, the term of this patent is extended or adjusted under 35 U.S.C. 154(b) by 131 days.

(21) Appl. No.: 17/434,123

(22) PCT Filed: Feb. 27, 2019

(86) PCT No.: PCT/EP2019/054884
§ 371 (c)(1),
(2) Date: Aug. 26, 2021

(87) PCT Pub. No.: WO2020/173562
PCT Pub. Date: Sep. 3, 2020

(65) Prior Publication Data
US 2022/0146348 A1 May 12, 2022

(51) Int. Cl.
*G01L 5/00* (2006.01)
*B23Q 17/09* (2006.01)
*G01L 1/16* (2006.01)

(52) U.S. Cl.
CPC ........ *G01L 5/0076* (2013.01); *B23Q 17/0966* (2013.01); *G01L 1/165* (2013.01)

(58) Field of Classification Search
CPC .... G01L 5/0076; G01L 1/165; B23Q 17/0966
See application file for complete search history.

(56) References Cited

U.S. PATENT DOCUMENTS 6,297,747 B1  10/2001  Magori et al.
7,289,873 B2 * 10/2007  Redecker ............. B23Q 1/0009
                                                  340/310.17

(Continued)

FOREIGN PATENT DOCUMENTS

| CN | 103111642 B | 4/2015 |
| EP | 2735400 A1 | 5/2014 |
| WO | 2015/011489 A1 | 1/2015 |

OTHER PUBLICATIONS

International Search Report and Written Opinion dated Jun. 12, 2019 which was issued in PCT/EP2019/054884.

(Continued)

*Primary Examiner* — Freddie Kirkland, III
(74) *Attorney, Agent, or Firm* — Buckley, Maschoff & Talwalker LLC

(57) ABSTRACT

Provided is a sensing system for wireless and passive monitoring of strain during a manufacturing process that depends on force to apply the energy into the manufacturing process, the sensing system comprising: at least one surface acoustic wave (SAW) sensor for detecting strain, the at least one SAW sensor being positioned in a force path located on or in the structure of one or more objects under test; and at least one transceiving antenna arrangement being connectable to the at least one SAW sensor, wherein the at least one SAW sensor and the at least one transceiving antenna arrangement are arranged to receive energy from an inter- (Continued)

rogation signal and output a strain response signal detected by the at least one SAW sensor in response to the interrogation signal.

36 Claims, 9 Drawing Sheets

(56) References Cited

U.S. PATENT DOCUMENTS

| | | | | |
|---|---|---|---|---|
| 8,113,066 B2* | 2/2012 | Eckstein | ............ | B23Q 17/0966 |
| | | | | 73/862.045 |
| 8,393,224 B2* | 3/2013 | Ballandras | .......... | G01P 15/0922 |
| | | | | 73/778 |
| 9,429,486 B2* | 8/2016 | Johnson | .................... | G01N 3/08 |
| 9,443,358 B2* | 9/2016 | Breed | ........................ | G06F 8/65 |
| 9,498,827 B2* | 11/2016 | Sjoo | ........................ | B23B 25/02 |
| 10,680,163 B2* | 6/2020 | Ting | ...................... | G01L 5/0076 |
| 2006/0085092 A1* | 4/2006 | Redecker | ............. | B23Q 17/098 |
| | | | | 700/174 |
| 2014/0140781 A1* | 5/2014 | Sjoo | ................... | B23Q 17/0966 |
| | | | | 408/8 |
| 2014/0358361 A1* | 12/2014 | Breed | ..................... | G07C 5/008 |
| | | | | 701/31.9 |
| 2022/0243537 A1* | 8/2022 | Kanyanta | ............... | E21B 10/567 |

OTHER PUBLICATIONS

R. Stoney et al: "The Development of Surface Acoustic Wave Sensors (SAWs) for Process Monitoring", Procedia CIRP, vol. 1, Jan. 1, 2012 (Jan. 1, 2012), pp. 569-574, XP055647481, NLISSN: 2212-8271, DOI: 10.1016/j.procir.2012.05.001.

Monedero M et al: "Miniature circularly polarized antenna for SAW sensor measurements", Wireless Sensing, Local Positioning, and RFID, 2009. IMWS 2009. IEEE MTT-S International Microwave Workshop on, IEEE, Piscataway, NJ, USA, Sep. 24, 2009 (Sep. 24, 2009), pp. 1-4, XP031558897, ISBN: 978-1-4244-5060-2.

* cited by examiner

SYSTEM FOR WIRELESS AND PASSIVE MONITORING OF STRAIN DURING MANUFACTURING PROCESSES

FIELD OF THE INVENTION

The present disclosure relates to a sensing system for wireless and passive monitoring of strain during a manufacturing process, being more particularly concerned with the problem of measuring the strain produced on an object under test, such as a cutting tool, workpiece, or workholding device, during a manufacturing process that depends on force to apply the energy into the manufacturing process.

BACKGROUND OF THE DISCLOSURE

One of the manufacturing processes that uses force is that known as machining which is the mechanical process of cutting/removing material from a workpiece in order to realise a component with a specific geometry/size/shape and or specfic surface finish. Machining is one of the most basic manufacturing methods. In high value manufacturing industries such as automotive, medical device and aerospace manufacturing, machining is at the core of all production processes. The cutting tool is one of the key components involved in machining, either directly engaged with the workpiece and cutting the workpiece material, or holding an "cutting tool insert" which engages with the workpiece and cutting the workpiece material. Cutting tools of varying designs can produce parts of different shapes and sizes ranging from simple to complex pieces. Cutting tools are used on computerised numerical control (CNC) machines, which can repeat sequences with high levels of precision, and produce complex pieces of various sizes and shapes. Various manufacturing techniques can be used to remove material during the process of shaping parts as defined in DIN 8580.

A workholding device is the generic term for any device used to firmly hold a workpiece during the manufacturing process, e.g. machining. Closely related terms are "jigs", "fixtures" and "clamps". A fixture holds the workpiece while it is undergoing the manufacturing process. A jig holds the workpiece and (in manual machining setups) also guides the cutter. "Fixtures" are colloquially workholding solutions that are custom made for a particular part or situation. "Clamps" are mechanical mechanisms used for tool or part fixturing/workholding.

In common types of machining process such as turning, tools with a single cutting edge are used for material removal. During the machining operation the cutting tool deforms the workpiece material until it shears off in the form of chips. Tribology is the examination of surfaces in contact with each other to determine how they will modify each other geometrically at certain temperatures and pressures. The deformation process requires significant energy, and the cutting tool endures a variety of mechanical, thermal, chemical, and tribological loads/forces. The combination of these loads eventually cause the cutting tool to deteriorate and wear out or fail. Therefore, the goal for having a good machining operation is to balance the energy required to remove material with the cutting tool's ability to reliably withstand the loads placed on it. The mechanical loads in form of cutting forces pass through the cutting tool into the tool holder into the machine structure; therefore all element in the force path experience forces of various levels that may lead to bending or tensile strains or combinations of same in those elements in the force path. For a given cutting tool (tip) geometry and material the correct machining parameters must be used to achieve a productive and cost-effective machining process. In well behaved machining processes, where tool wear is gradual, the tool life can be determined and the tool change interval may therefore be optimised using some tool wear criterion, such as the maximum flank wear. For more complex materials and demanding machining processes, tool wear may become excessive and sudden events, such as tool chipping and breakage, will most likely occur. In these situations, tool life becomes much more challenging to predict since unexpected wear events can occur within a relatively short time interval. The behaviour of the machining process is also dependent on the workpiece material, cutting tool material and geometry, actual machining process parameters and the condition of the overall machining system. Hardness variations in the workpiece material, which can be traced back to the manufacturing of the workpiece material itself, is another factor which may increase the unpredictability of the machining process, leading to drastically shorter tool life, tool chipping and tool breakage.

The cutting zone is a very inhospitable place. The moving tool, chips, coolant and heat make the installation of sensors a challenge. Measurement of the conditions experienced by the cutting tool (tip) in the cutting zone is thus impractical. However, various methods exist for indirect assessment of cutting conditions and the cutting process based on measurement of phenomena occurring on the cutting tool. This is referred to as tool condition monitoring (TCM). The main task of the TCM system is to collect relevant data from the machining process, then process and analyse the data to detect symptoms of trouble, but also to signal a control function to adjust the machining process parameters to a more stable machining region. Within the stable region, optimisation can be performed to meet some criterion, such as maximising the material removal rate, minimising the production cost, etc. Process instabilities are often recognised as increased vibration amplitudes, which may cause unexpected events such as tool failures, which can be harmful to the workpiece and cutting tool. State-of-the-art approaches used in tool condition monitoring (TCM) of CNC turning machines are based mainly on measurement of:
- cutting force components using a multi-channel table dynamometer or rotating dynamometer
- vibration amplitude using multi-channel accelerometers
- audible sound from the machining process
- acoustic emission (AE)
- measurement of spindle motor power or axes motor power Measurement of cutting forces on the cutting tool during machining is the most widely used and preferred TCM approach as cutting forces have a direct relationship with the cutting process itself. Static and dynamic components of the cutting force contain information about the state of chip formation and the cutting tool. Cutting force is a variable in the machining process that can be controlled and optimised via the machine cutting parameters. Measurement of cutting forces can provide information regarding: machinability of materials, wear mechanisms, surface qualities, form deviations, vibrations/unstable engagement conditions, residual stresses, and thermal energy in the machining process. Monitoring of cutting force in the machining process is thus desirable in order to predict and extend cutting tool-tip life, mitigate scrap and improve machining productivity.

Here to fore, the typical sensor solution used to measure cutting force is the force dynamometer. Cutting force dynamometers for turning are typically designed to mount in a machine tool-post/tool-block. Fabrication of a "custom adapter" may be necessary to mount the dynamometer on a machine turret in some cases. The cutting tool/holder is mounted in the dynamometer instead of a conventional tool-post/tool-block.

These monitoring solutions for machining are expensive, very invasive to the machining process, and often require a complex measurement chain e.g. power and amplification circuitry. The modifications needed to incorporate conventional measurement solutions in the machining process and the expense of the endeavour make widespread integration of this technology into production systems impractical. As a result, the use of monitoring solutions including force dynamometers to realise detailed process analysis capabilities is limited to applications on dedicated R&D machining centres and or limited short duration machining test scenarios.

In view of the above-described technologies, there is therefore a need for a method and system which addresses at least the problems outlined above.

SUMMARY OF THE INVENTION

These and other problems are addressed by providing a system according to claim 1. Advantageous features are provided in dependent claims.

The present disclosure provides an arrangement for the wireless and passive monitoring of strain in an object under test using at least one surface acoustic wave (SAW) sensor, useful in a manufacturing arrangement where the path and/or distance between an interrogation antenna and at least one SAW/transceiving antenna arrangement may change with time, may contain materials such as fluids, vapours, metal particles, metallic objects or metallic surfaces that can interfere with the electromagnetic signal between the interrogation antenna and the at least one SAW/transceiving antenna arrangement.

Of the manufacturing processes defined in DIN8580, the present disclosure is primarily concerned with manufacturing processes that depend on the use of force, therefore the application of the system of the present disclosure is concerned with manufacturing methods including material removal processes such as machining, grinding and broaching; surface deformation processes such as burnishing, knurling and impact peening, shaping processes such as spinning and roll forming, forming processes such as incremental forming, joining processes such as friction stir processes and friction welding, as well as vibration and ultrasonic assistance of the aforementioned manufacturing processes as examples.

These and other features will be better understood with reference to the following figures which are provided to assist in an understanding of the present teaching, by way of example only.

DETAILED DESCRIPTION

Figure 1A:
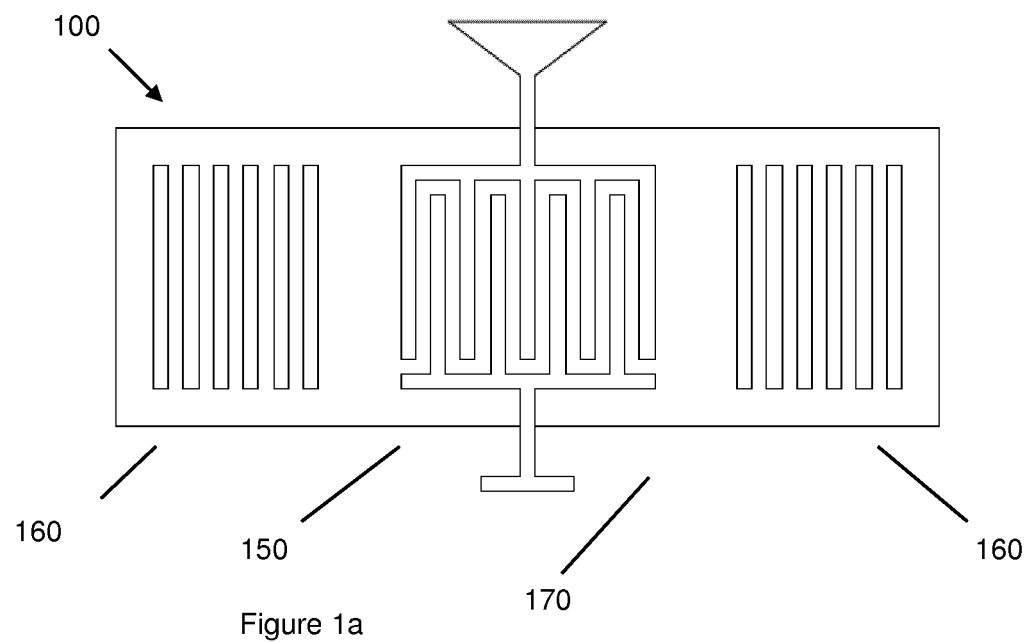
FIG. 1a and FIG. 1b are diagrams illustrating a single port surface acoustic wave (SAW) resonator for strain measurement.

Embodiments of the present disclosure will now be described with reference to some exemplary methods and systems described herein. It will be understood that the embodiments described are provided to assist in an understanding of the present disclosure and are not to be construed as limiting in any fashion. Furthermore, modules or elements that are described with reference to any one figure may be interchanged with those of other figures or other equivalent elements without departing from the spirit of the present disclosure.

The present disclosure provides an arrangement for the passive monitoring of strain (an environmental parameter) in an object under test using at least one surface acoustic wave (SAW) sensor, useful in an environment where the path and/or distance between an interrogation antenna and at least one SAW/transceiving antenna arrangement may change with time, may contain materials such as fluids, vapours, metal particles, metallic objects or metallic surfaces that can interfere with the electromagnetic signal between the interrogation antenna and the at least one SAW/transceiving antenna arrangement.

Accordingly, the present disclosure provides a sensing system for wireless and passive monitoring of strain during a manufacturing process that depends on force to apply the energy into the manufacturing process, the sensing system comprising: at least one surface acoustic wave (SAW) sensor for detecting strain, the at least one SAW sensor being positioned in a force path located on or in the structure of one or more objects under test; and at least one transceiving antenna arrangement being connectable to the at least one SAW sensor, wherein the at least one SAW sensor and the at least one transceiving antenna arrangement are arranged to receive energy from an interrogation signal and output a strain response signal detected by the at least one SAW sensor in response to the interrogation signal.

The one or more objects under test may comprise at least one of a cutting tool, workpiece, and workholding device. A cutting tool is any tool that is used to remove material from a workpiece by means of shear deformation. A workpiece will be understood as an object being worked on with a tool or machine. In the context of the present disclosure, a cutting tool comprises any tool used for machining operations, examples of which are milling, turning, boring, and reaming. The cutting tool may also comprise a tool insert, tool holder, and/or cutting tool shank.

A workholding device is the generic term for any device used to firmly hold a workpiece while it is being machined. Examples of workholding devices are clamps, jigs and fixtures. That is, clamps, jigs and fixtures are used to hold the workpiece while being machined.

The strain on the one or more objects under tests occurs in response to forces exerted thereon during a manufacturing process, the strain magnitude being measured to infer or derive; the forces exerted on the one or more objects under test, the wear state of a cutting tip, the presence of vibration or chatter in the cutting process, or the energy associated with the manufacturing process.

The sensing system is configured for wireless and passively monitoring strain during manufacturing processes that depend on force to apply the energy into the manufacturing process, including material removal processes such as machining, grinding, broaching; surface deformation processes such as burnishing, knurling and impact peening, shaping processes such as spinning and roll forming, forming processes such as incremental forming, joining processes such as friction stir processes, friction welding, as well as vibration and ultrasonic assistance of the aforementioned manufacturing processes.

Figure 1B:
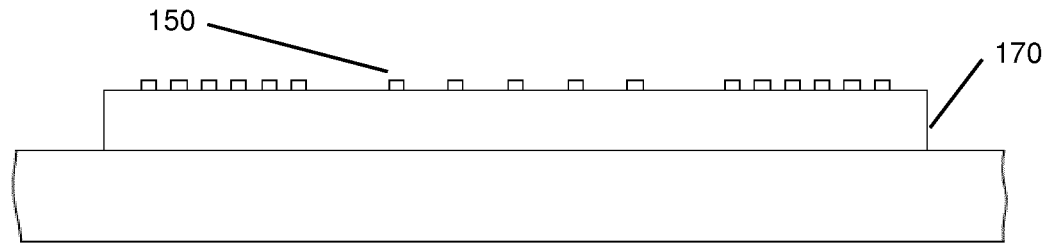

The present teaching exploits strain sensing technology based on Surface Acoustic Waves (SAW), specifically; Rayleigh waves to implement a wireless cutting force measurement solution. SAW devices and sensors use a piezoelectric material to generate the acoustic wave. Piezoelectricity refers to the production of electrical charges by the imposition of mechanical stress. Certain piezo electric materials such as Quartz and Lithium Niobate create on their surface a mechanical stress/displacement (surface acoustic wave) if an electrical field is applied. The phenomenon is reciprocal. When an oscillating electric field is applied to a SAW sensor a mechanical (acoustic) wave is generated, which propagates through the piezoelectric substrate and is then converted back to an electric field for measurement. As the acoustic wave propagates on the surface of the material, any changes to the characteristics of the propagation path will affect the velocity and/or amplitude of the wave. SAW sensors utilise this relationship for the measurement of physical quantities including temperature, pressure, force, strain. Acoustic propagation velocity is very sensitive to changes in surface state so SAW strain sensors utilising the operating principle can be fabricated with very high sensitivity. Such sensors are fabricated, using a photolithographic process, by depositing a precise metal electrode arrangement, known as an interdigital transducer (IDT), on the surface of a polished piezo-ceramic substrate. A SAW resonator (SAWR) is essentially a resonant cavity in which a first transducer electrode converts the electrical signal, usually a radio frequency (RF) oscillating signal, into a lateral mechanical wave. The resulting SAW propagates on the piezoelectric substrate until it reaches a second electrode, where it is transduced back into the electrical domain. When arriving at the second electrode, and typically aided by one or more reflector electrodes, the acoustic wave bounces back in the direction of the first electrode, and the electromechanical conversion is repeated indefinitely. Thus the acoustic wave is trapped in the cavity formed by the resonator electrodes. SAW resonators may be fabricated in either one-port or two-port configurations. FIG. 1(a) illustrates the IDT electrode setup of a single-port SAWR strain sensor 100. Referring to FIG. 1a, the single-port SAW resonators has a single IDT 150 generating and receiving the SAW, and two grating reflectors 160 which reflect the SAW and generate a standing wave between the two reflectors 160. The IDT electrically excites a wave which is contained by the two reflective grating strips. The IDT 150 can generate, detect and influence the propagating SAW waves. FIG. 1b illustrates the IDT 150 on the surface of a polished piezo-ceramic substrate 170.

Figure 2:
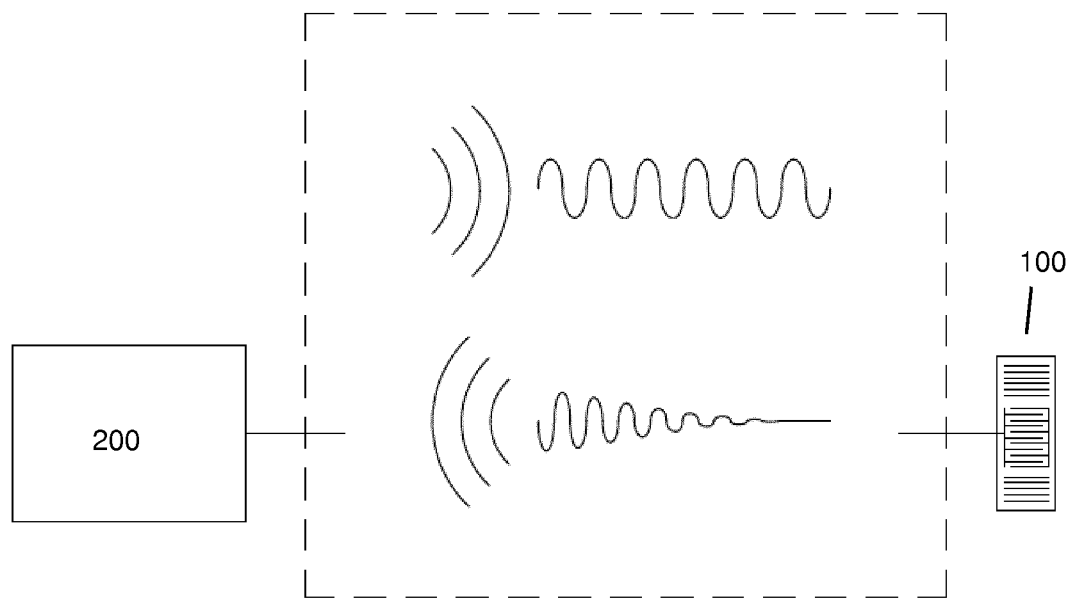
FIG. 2 illustrates a SAW interrogator operating as a wireless RF transceiver.

A key property of a SAW resonator is its ability to store energy. SAWR based sensors can thus be implemented that operate 'passively' in isolation without any active part, i.e. without any power supply or oscillators. The resonant response of passive SAW strain sensors can be monitored wirelessly using an RF interrogator to monitor strain. The interrogator acts as a transceiver, transmitting a characteristic RF pulse to the SAWR sensor and then post processing an RF response signal generated by the SAWR sensor to extract information on the measured quantity, as illustrated in FIG. 2. The SAWR sensor 100 is illustrated in FIG. 2 along with a SAW interrogator 200 operating as a wireless RF transceiver. The resonant frequency of the SAWR strain sensor shifts up or down corresponding and in proportion to the strain magnitude sensed by the sensor which may be a compressive or tensile strain.

Robust and reliable measurement performance is an important criterion for any wireless monitoring system. In a 'passive' wireless sensor measurement system the RF measurement chain must be designed to meet the challenges of the propagation environment. The design of CNC machining centres can vary greatly depending on the intended application and manufacturer; however, basic features are common to most types. Major components in a lathe, for example, will include a headstock, bed, carriage, and tailstock. In a machine equipped with a turret, the turret holds the tool holders and indexes them as needed, the spindle & chuck assembly holds the workpiece and there are motor driven slides that allow the turret move in multiple axes simultaneously. A common material used for the machine bed, support structures, and drive mechanism housings is cast Iron. Smaller sub-assembles are fabricated from various grades of steel. All drive components, rotary joints, and linear slides in the work area are covered by metal guards to prevent damage from accumulation of hot chips, cutting fluids, and other contaminants present in the cutting process. For practical and safety reasons, the working area of a CNC machine is enclosed within a metal enclosure which typically incorporates an interlocked door system for access.

Of particular relevance to the present teaching is the propagation of radio waves within the enclosed working area of a CNC machine, the machining environment. Radio frequency (RF) waves are oscillating electrical signals at electromagnetic wave frequencies that lie in the range extending from around 3 kHz to 300 GHz, which include those frequencies used for wireless communications and radar. When implementing an RF link within the enclosed work area of a CNC machine, the metal enclosure and parts within it may cause multiple unwanted reflections of transmitted RF signals, generating a spatial distribution of the RF energy which is dependent on the size and on the shape of the metal enclosure, and on parts seen as obstacles which could also be placed inside of the machine enclosure. The spatial distribution of RF energy may then exhibit minima and maxima of power values. If one or more of the antennas comprising an RF link is positioned near to a minimum value, this may result in a poor communications link i.e. the channel will exhibit very high path loss.

Furthermore, the proximity of electrically conductive materials such as metal parts or conductive liquids to an antenna may result in antenna detuning. When conductive materials are placed in the reactive near field of an antenna this results in energy being coupled from the antenna to said conductive material. This energy coupling may significantly change the electrical impedance of the antenna and detune/shift the frequency response of the antenna out of the desired frequency band of operation. The symptoms of this antenna detuning by metal and liquids on an RF communications link are shorter communication ranges, lower communication data rates and possibly failure to establish a communications link.

Chips, also known as swarf or by other process-specific names (such as turnings, filings, or shavings), are pieces of metal, wood, or plastic that are the debris or waste resulting from material-removal manufacturing processes. Chip geometry can vary from small dust like particles to long, stringy tendrils such as the springy chips from turning tough metals. When turning metals, optimum cutting efficiencies often generate long spring-like chips. The generation of metal chips during machining presents an additional challenge for effective RF communications as the metal chips formed may impede/reflect EM waves and act as obstacles in the RF transmission channel that must be overcome.

A still further consideration with regard propagation of RF in the machining environment is the use of cutting fluids. Cutting fluids are used in metal machining for a variety of reasons such as improving tool life, reducing workpiece thermal deformation, improving surface finish and flushing away chips from the cutting zone. Practically all cutting fluids presently in use fall into one of the four following categories: straight oils, synthetic fluids, soluble oil fluids, and semi-synthetic fluids. Straight oils are non-emulsifiable and are used in machining operations in an undiluted form. They are composed of a base mineral or petroleum oil and often contain polar lubricants such as fats, vegetable oils and esters as well as extreme pressure additives such as Chlorine, Sulphur and Phosphorus. The other commonly used cutting fluids are used in a diluted form (3 to 10%) mixed with water. The principal methods of cutting fluid application include flood application; a flood of cutting fluid is applied on the workpiece, jet application; a jet of cutting fluid is applied on the workpiece directed at the cutting zone, mist application; cutting fluid is atomised by a jet of air and the mist is directed at the cutting zone. With regard RF signal propagation, higher RF frequencies (above 1 GHz) are strongly attenuated by water, water mists and fluids in general.

The present disclosure addresses the myriad of problems associated with RF transmission in the challenging environment described. This is achieved through selection of appropriate RF antennas, transceiver antenna configurations, signal transmission parameters, and through use of an optimised RF measurement chain design.

A description of the at least one transceiving antenna arrangement is provided as follows. Different types of antenna exist with properties optimised for different RF propagation requirements and environmental conditions. In general, antenna geometry varies according to RF wavelength, required frequency bandwidth, and antenna beam directivity. An unlicensed frequency band that is frequently used in SAW sensor applications is the 434 MHz ISM band. A drawback of operating in this spectrum is the large antenna size required to operate efficiently, the dimension of a $\lambda/4$ monopole being 17 cm. The geometry available to accommodate an antenna on a cutting tool is also restricted in many cases. For example, on a 25 mm thick square shank toolholder, the length of overhang available for antenna mounting may be in the order of 30 mm. Accommodating a 434 MHz ISM band antenna and associated ground plane within a restricted geometry such as in the shank toolholder example given is a significant challenge. A miniaturized antenna and ground plane configuration is a key requirement. Another practical requirement relating to antenna form factor is that the antenna & ground-plane assembly does not provide a snag risk during machining. The transceiving antenna assembly cannot have obtrusions that would protrude into the machining region or lead to an accumulation of chips/swarf on the toolholder. Another essential transceiving antenna requirement is reliable operation in the presence of metal. Metallic environments generally degrade antenna performance, detuning the antenna's frequency response away from the desired frequency band of operation. However, the transceiving antenna may be required to be mounted on or near a metal toolholder. The toolholder material is typically manufactured from high-carbon steel or a Tungsten Carbide. The transceiving antenna arrangement must also operate within a metal CNC machining enclosure in the vicinity of several metallic parts, some of which are in motion during the machining process. Appropriate bandwidth is another requirement; the transceiving antenna must have sufficient half power bandwidth to allow its use with multiple adjacent SAWR sensor frequencies within a chosen frequency band e.g. 432 to 435 MHz. The transceiving antenna must have best possible radiation efficiency in its given form factor since SAWR sensors are passive devices and no power source will be available to amplify signals to or from the antenna. Another transceiving antenna requirement relates to antenna transmit/receive beam directionality. The transceiving antenna should have a broad directionality (beam aperture) to allow it receive radio waves originating from an RF source that is not directly orthogonal to it but may be at an oblique angle to it. This is because in a cutting tool application the cutting tool and its antenna will move, typically in a linear plane, within the confines of the CNC work area.

Accordingly, in view of the above, the at least one transceiving antenna arrangement may comprise a radiating element and a conductive layer on a printed circuit board (PCB) acting as a ground plane for the radiating element. The conductive layer may be electrically connected to a collocated additional metal structure for extending a total effective size of the ground plane, the collocated additional metal structure comprising the one or more objects under test. The radiating element may have a planar design and may be mounted a fixed distance above the ground plane such that antenna radiation is directed away from the ground plane. The at least one transceiving antenna arrangement may comprise a low profile antenna configured for transmission and reception of RF signals in the UHF band. The UHF band comprises the 434 MHz ISM band. The sensitivity/range of the at least one transceiving antenna arrangement is fulfilled as part of the object under test, wherein the at least one transceiving antenna arrangement may be arranged to be mounted on or in the object under test or a protective enclosure via the conductive layer acting as a ground plane. The ground plane is thus electrically connectable to a collocated additional metal structure for extending a total effective size of the ground plane, e.g. the structure of the object under test, the enclosure of the object under test, and therefore by extension the machine tool structure.

Figure 3:
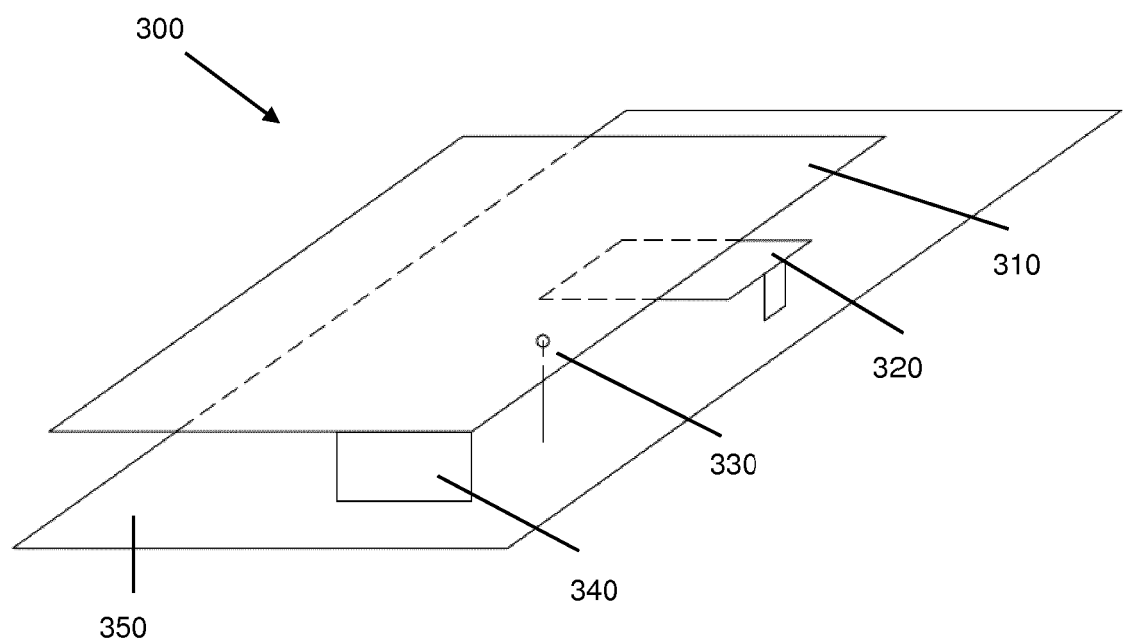
FIG. 3 illustrates the design of a PIFA antenna.

The at least one transceiving antenna arrangement may comprise a Planar inverted-F antenna (PIFA). A variant of the patch antenna commonly used in mobile telecommunications devices is a planar inverted-F antenna (PIFA). The planar inverted-F antenna (PIFA) is a type of antenna that combines features of a single wire monopole antenna and planar patch antenna designs. It originates from the inverted-F antenna which is essentially a monopole antenna parallel to a ground plane, with a short circuit arm implemented. The short circuit arm, acts as impedance matching for the antenna. Since monopole antennas are naturally capacitive, the antenna can be matched to the desirable impedance (usually 50Ω) with an added inductance; the short circuit provides this inductance. This means that fewer passive components are needed for impedance matching, and with less parasitic loss in such elements, radiation efficiency is higher. In a PIFA antenna design the single wire monopole is replaced with a top plate similar to a patch antenna. FIG. 3 illustrates the design of a PIFA antenna 300, including a planar element 310, a capacitor 320, a feeding point 330, a short circuit plate 340, and a ground plane 350. PIFA antennas have a near omnidirectional radiation pattern and mixed radiation polarization.

PIFA antennas are inherently narrow band in terms of their frequency response. However, the antenna bandwidth can be widened, using different design techniques e.g. incorporating slots in the radiating plate and adding parasitic ground-plane elements. Also, the size of the top plate can be optimised using these methods, and thus smaller antennas can be created. The size of the PIFA can also be reduced by using so-called top loads, although not without consequences. By adding small capacitances at one end of the antenna lower frequencies can be reached. Doing so decreases the radiation capabilities of the antenna, but can be used to achieve a compromise between antenna size and performance for a certain application. Commercial PIFA antenna designs incorporate some or all of these techniques.

One of the biggest advantages of a PIFA antenna is its reduced size. Furthermore, variations of this antenna are available commercially that can be mounted directly on top of a printed circuit board (PCB) such that the PCB acts as the antenna ground-plane; sometimes referred to as an 'on-ground antenna'. For the tooling application described, this type of antenna & ground-plane configuration is particularly attractive. Since the antenna is positioned above and parallel to the PCB, the only required space is where the mounting pins of the antenna are positioned. No clearance toward the ground or other metal is needed, which means it is possible to mount components underneath the antenna, on both sides of the PCB.

Figure 4A:
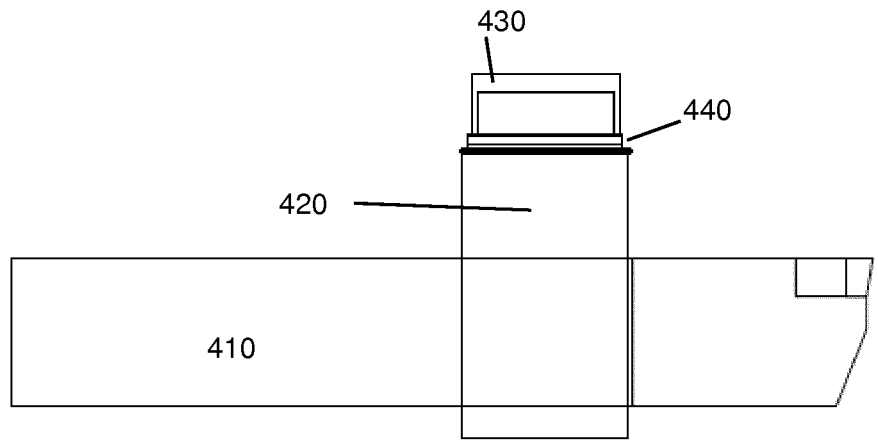
FIGS. 4a to 4c illustrate extending the effective groundplane of a PCB mounted PIFA antenna.
Figure 4B:
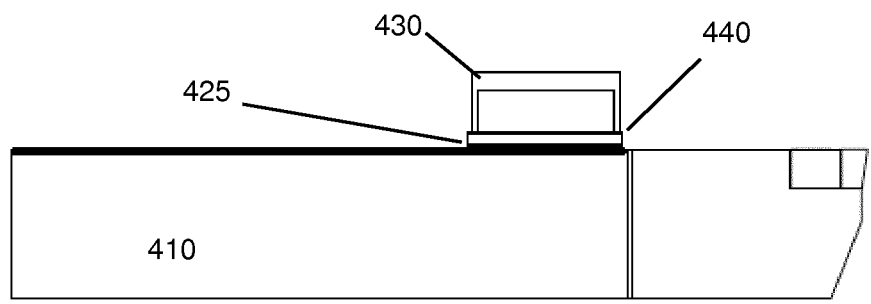
Figure 4C:
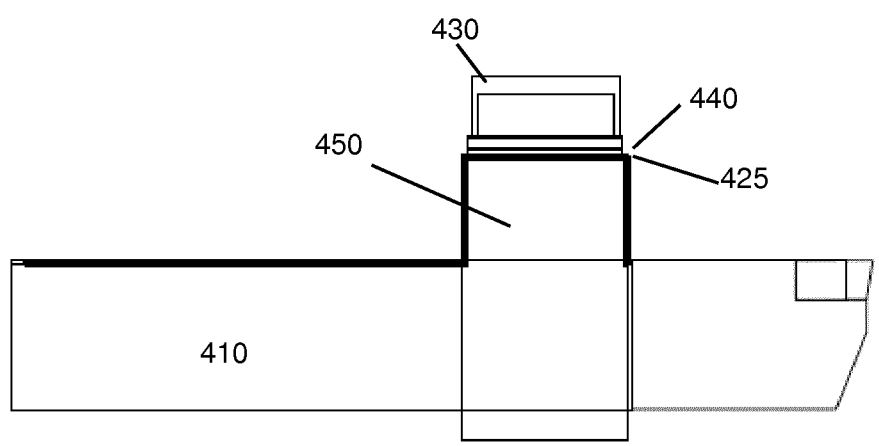

For a PIFA antenna, the size and shape of the ground plane affect the radiation efficiency of the antenna. As the effective size of the ground plane is reduced the radiation efficiency of the antenna decreases. In a tooling application, where the area available to accommodate the PIFA ground-plane PCB is restricted it is possible to extend the effective area of the ground-plane by electrically linking the antenna PCB ground-plane to a supporting metal structure and/or to the toolholder body itself which is invariable metal. Some examples are illustrated in FIGS. 4a to 4c. FIG. 4a shows a PIFA antenna 430 mounted on a small form factor PCB whose small ground plane 440 size results in the antenna having a poor radiating efficiency. The PIFA antenna 430 and ground plane 440 are disposed on a non-metallic structure 420. Reference numeral 410 illustrates a metallic toolholder shank. FIGS. 4b & 4c show how the effective size of the antenna ground plane is increased by electrically and physically connecting the copper ground plane of the small PCB to the metal of a supporting metal assembly 450 and to the metallic toolholder shank 410 using an electrical bonding layer 425. The effective length of the ground place 440 is illustrated in bold in FIGS. 4a to 4c.

The at least one SAW sensor may comprise two or more SAW sensors. The system may be configured that only at least one or more selected SAW sensors of the two or more SAW sensors are interrogated. An environmentally actuated RF switch may be used for selecting the at least one or more SAW sensors to be interrogated, as will be described later. Two or more SAW sensors may be used for sensing a differential strain measurement, wherein a first SAW sensor is arranged to be mounted on a first surface of the one or more objects under test and a second SAW sensor is arranged to be mounted on a second surface of the one or more objects under test. The first and second SAW sensors may be arranged to be mounted in a direction of bending strain.

Each of the one or more objects under test may be configured to have a unique identity, wherein the SAW sensor and transceiving antenna coupling combination for each object under test together generate a unique digital signature which forms the basis for the unique identity. An RF impedance matching circuit may also be used to generate the unique digital signature The SAW sensor may be collocated with an RFID tag sharing a multiband antenna on each of the one or more objects under test. The at least one SAW sensor may be reconfigurable after mounting on or in the structure of the object under test generating a unique digital signature. Reconfiguration may be enabled through preloading of the SAW structure, or manipulation of the SAW interdigital finger or reflector bank characteristics.

The system of the present disclosure may also comprise at least one interrogation antenna for transmitting the interrogation signal and receiving a response signal from the at least one transceiving antenna arrangement connectable to the at least one SAW sensor. The at least one transceiving antenna arrangement is arranged for wireless communication with the at least one interrogation antenna. The at least one interrogation antenna and the at least one transceiving antenna arrangement are arranged to be oriented such that electro-magnetic RF radiation patterns of the at least one interrogation antenna and the at least one receiving antenna intersect. All the energy used to power the one or more SAW sensors comes from the RF signal transmitted to the at least one transceiving antenna arrangement by the at least one interrogation antenna. Furthermore, as described above, the at least one transceiving antenna arrangement may be of a miniature PIFA design that will have compromised RF transmission/reception performance. Compliance with international regulatory requirements limits the maximum RF power that can be output by the interrogator hardware operating in a given frequency band. An efficient interrogation antenna design is thus essential to maximise the practical RF transmit/receive range of the SAW sensor system and to ensure adequate signal to noise ratio and a robust wireless measurement chain. A practical means of maximising the RF signal strength arriving at the at least one transceiving antenna arrangement is to utilise an efficient interrogation antenna design which radiates or receives greater power in specific directions allowing for increased performance and reduced interference from unwanted sources. Such an antenna design is referred to as a directional antenna. A high-gain antenna (HGA) is a directional antenna with a focused, narrow radio wave beam width. This narrow beam width allows more precise targeting of radio signals in a given vector. When transmitting, a high-gain antenna allows more of the transmitted power to be sent in the direction of the receiver, increasing the received signal strength. When receiving, a high gain antenna captures more of the signal, again increasing signal strength. Due to reciprocity, these two effects are equal. As a consequence of their directivity, directional antennas also send less (and receive less) signal from directions other than the main beam. This property may be used to reduce interference.

Another important requirement of the at least one interrogation antenna is its bandwidth since multiple SAWs operating at adjacent but differing centre frequencies in the band must be interrogated. The fractional bandwidth of an antenna is a measure of how wideband the antenna is. If the antenna operates at centre frequency fc between lower frequency f1 and upper frequency f2 (where fc=(f1+f2)/2), then the fractional bandwidth FBW is given by: (f2−f1)/fc. Fractional bandwidth is a function of the span and the centre frequency of an antenna. The fractional bandwidth varies between 0 and 2, and is often quoted as a percentage (between 0% and 200%). For SAW sensor applications using the 433 MHz ISM band, a fractional bandwidth of 1.6% or greater is required.

Figure 5A:
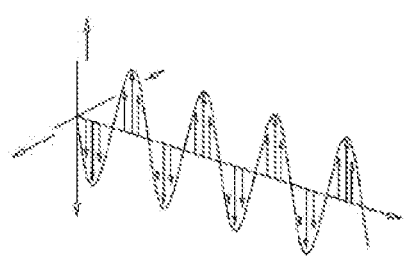
FIGS. 5a to 5d illustrate linear and circular polarisation of antennas.
Figure 5B:
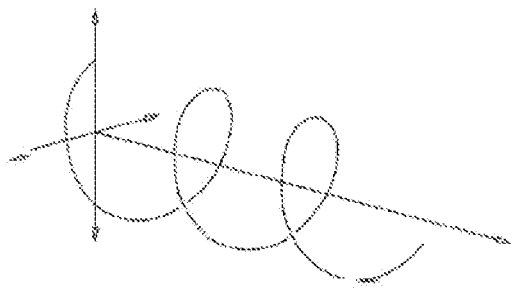
Figure 5C:
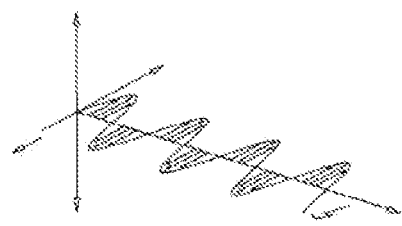
Figure 5D:
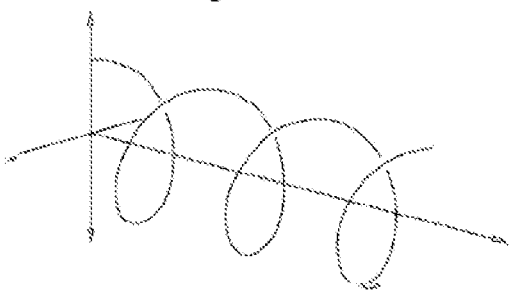

Common designs of directional HGA are the Yagi antenna, the log-periodic antenna, the corner reflector antenna. However, these HGA designs are typically large and bulky. A patch antenna (also known as a rectangular micro-strip antenna) is a type of directional radio antenna. The unique property of the micro-strip patch antenna is its two-dimensional structure which allows the manufacture of a low profile light weight antenna, suitable for mounting on a flat surface. Since the area available inside a CNC machine enclosure is limited and it is desirable that the interrogator is of a non-obtrusive design that does not present snagging hazards a patch antenna offers an attractive solution. With patch antennas designs the polarization or orientation of the radio wave can be designed to radiate in either linear or circular polarization, as illustrated in FIGS. 5a to 5d. FIG. 5a illustrates horizontal linear polarisation, FIG. 5b illustrates left hand circular polarisation, FIG. 5c illustrates vertical linear polarisation, and FIG. 5d illustrates right hand circular polarisation. A linear polarized (LP) patch antenna radiates wholly in one plane containing the direction of propagation. In a circularly polarized patch antenna, the plane of polarization rotates in a corkscrew pattern, making one complete revolution during each wavelength. A circular polarized wave radiates and receives RF energy in both the horizontal and vertical planes and all planes in between.

The signal propagation properties, of circular polarized (CP) patch antennas offer performance advantages over linear polarized variants for RF signal transmission/reception in the challenging RF propagation environment present within the work envelope of a CNC machine. Furthermore, the use of a CP patch antenna with radio frequency (RF) interrogator delivers better connectivity with SAW based sensors equipped with a linearly polarized PIFA antenna. Circular polarization may be obtained by the physical dimensions and geometry of the patch radiator such that two orthogonal modes are excited with a 90° time-phase difference between them. Alternatively, for the square patch antenna design, circular polarization is excited by feeding the element at two adjacent edges. The quadrature phase difference being obtained by feeding the element with a 90° power divider.

CP patch antennas can be used to address challenges associated with device mobility, adverse propagation path conditions, and non-line-of-sight scenarios. In a mobile application, e.g., passive sensing device integrated on a movable part within a CNC machine, the orientation of a linearly polarised sensor transceiver antenna may not be correctly aligned with the interrogation antenna. This can lead to out of phase RF transmission issues. Use of a CP patch antenna on the RF interrogator side can mitigate this issue because RF energy is transmitted in all planes, making for the RF link with the LP transceiver antenna more reliable regardless of relative antenna orientation. The propagation characteristics of circularly polarized RF signals make them more resistant to signal degradation due to obstructions i.e. metal chips/swarf thrown off during the cutting process, and This is due to the CP signal being transmitted in all planes, providing an increased likelihood that the signal will not be adversely impacted by obstructions and other environmental conditions. CP antennas are less susceptible to multi-path effects than LP antennas. Multi-path is when the primary signal and the reflected signal reach a receiver at nearly the same time. Since a CP antenna transmits in all planes there will be a lower likelihood of signal cancellation.

Accordingly, the at least one interrogation antenna may comprise a directional patch antenna such as a linear or circularly polarised patch antenna. The at least one interrogation antenna may be configured to have a 3 dB radiating beam width. The at least one interrogation antenna may be configured to have a radiating beam of between about 70° and about 90° in azimuth and elevation.

The at least one interrogation antenna may comprise a single interrogation antenna. In another embodiment, the at least one interrogation antenna may comprise a multi-antenna array comprising at least two interrogation antennae. The multi-antenna array may have antenna spacing less than half-wavelength and antenna elements arranged to form a 1 or 2 dimensional antenna array. The multi-antenna array may be configured to create a radiation pattern with increased directivity and antenna gain in a given direction. The multi-antenna array may comprise a plurality of mutually spaced antennas of the same construction, each of the antennas being connected to a separate physical channel of the at least one transceiving antenna, whereby only one transceiving antenna interrogation antenna pairing is used for communications at a time. The system may be configured to select the transceiving antenna interrogation antenna pairing that delivers the strongest SAW sensor return signal. As mentioned above, the at least one interrogation antenna may comprise a circularly polarised patch antenna. The at least one interrogation antenna may have a reconfigurable directional RF beam adapted for the application environment. The application environment is typically a metal surrounding containing intermittent metal moving parts and may have additional intermittent environmental influences from fluid flow, fluid jet, mist, fumes, metal or polymer particles and metal and polymer chips. The relative distance and spatial orientation between the at least one interrogation antenna and the transceiving antenna on the object under test may vary. In this regard, the at least one interrogation antenna may comprise an optimisation algorithm for tuning the at least one interrogation antenna to the application environment. The optimisation algorithm may be configured for tuning the resonance frequency and/or RF transmit power level of the at least one interrogation antenna.

Figure 6:
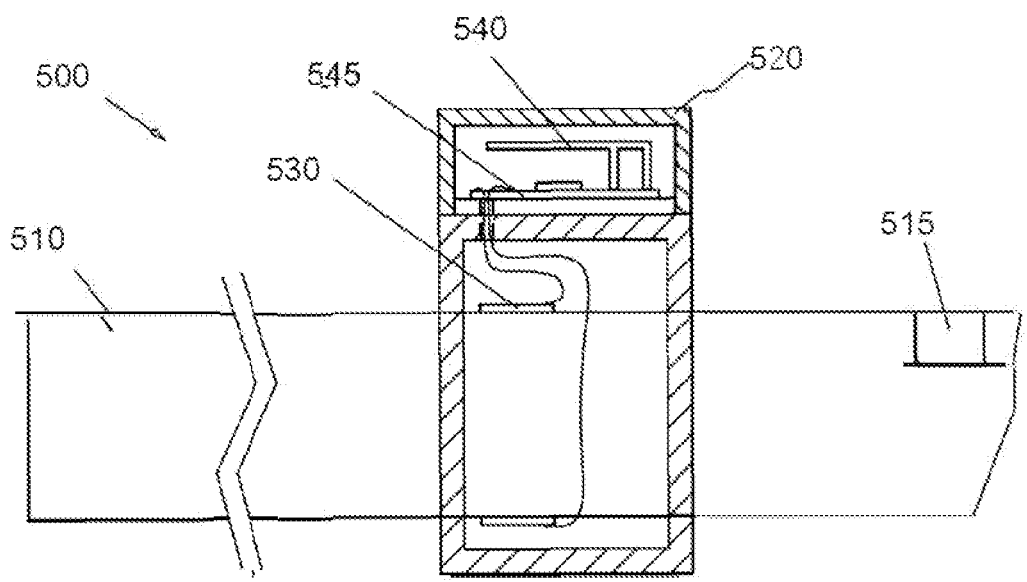
FIG. 6 is an exploded view of a SAW instrumented cutting tool according to an embodiment of the present disclosure.

FIG. 6 is an exploded view of a SAW instrumented cutting tool 500 according to an embodiment of the present disclosure. Referring to FIG. 5, the cutting tool 500 comprises a tool shank 510, a cutting insert 515, and a protective enclosure 520 enclosing a SAW sensor 530, and a PIFA antenna 540 disposed on a PCB 545.

Figure 7:
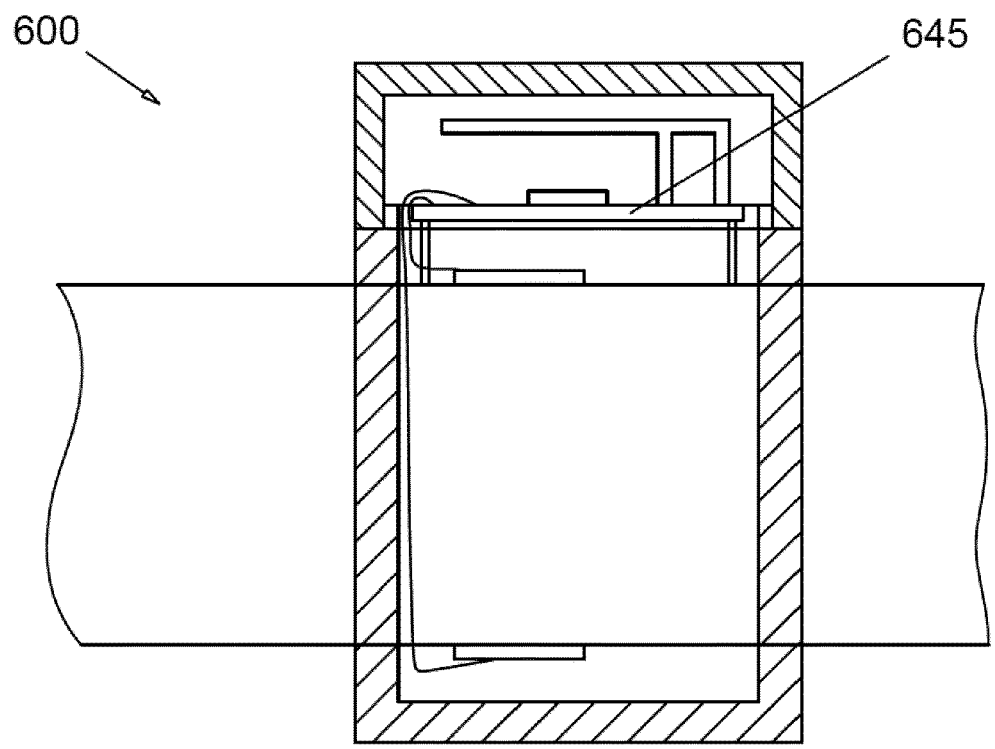
FIG. 7 is an exploded view of a SAW instrumented cutting tool according to another embodiment of the present disclosure.

FIG. 7 is an exploded view of a SAW instrumented cutting tool 600 according to another embodiment of the present disclosure. Referring to FIG. 7, a PCB 645 is fixed to the cutting tool 600.

Figure 8:
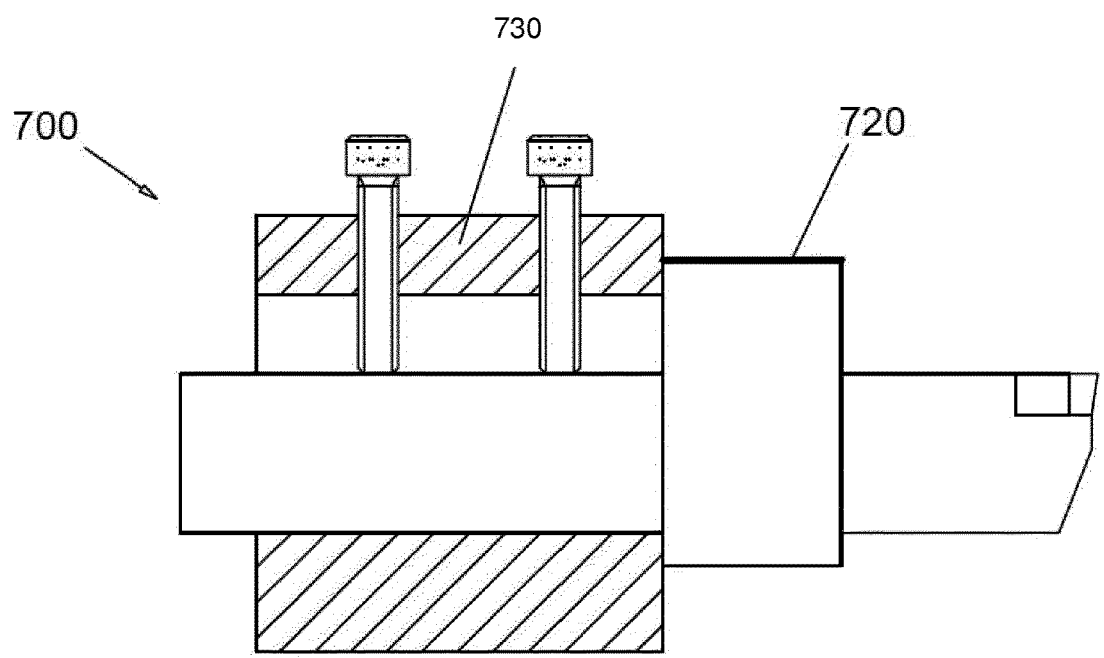
FIG. 8 is an exploded view of a SAW instrumented cutting tool in a cantilever arrangement according to another embodiment of the present disclosure.

FIG. 8 is an exploded view of a SAW instrumented cutting tool 700 in a cantilever arrangement according to another embodiment of the present disclosure. Referring to FIG. 8, a protective enclosure 720 is attached to the SAW-instrumented surface which completely or partially surrounds the instrumented cutting tool 700 under test, using the surface of the cutting tool 700 as a surface for the enclosure, and contains and protects the delicate components such as the SAW and its wire bonding, but also the SAW antenna, its associated PCB and wiring, and identification means for the SAW strain sensor module. The protective enclosure 720 can also be used to serve as an indexing means for an object under test. The protective enclosure 720 may be positioned to facilitate reproducible mounting of the object under test in a clamping arrangement. For example, the protective enclosure 720 can be used to ensure that the object under test is clamped using a clamp 730 for use or calibration with the same "overhang" or cantilever length.

Figure 9:
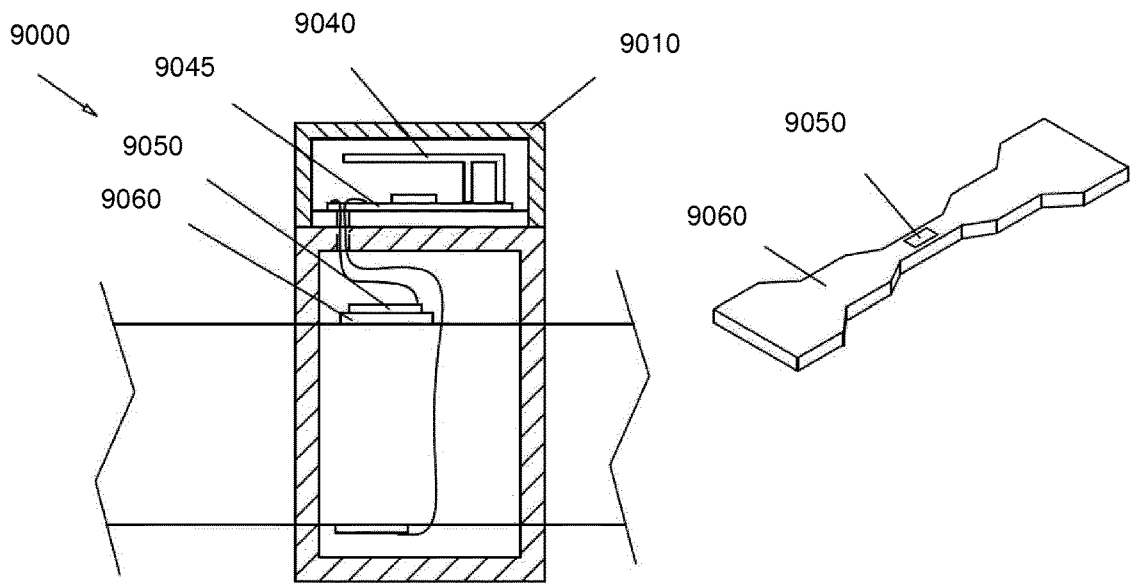
FIG. 9 illustrates antenna mounting configurations on a SAW instrumented cutting tool according to embodiments of the present disclosure.

FIG. 9 illustrates an antenna mounting configuration on a SAW instrumented cutting tool 9000 according to an embodiment of the present disclosure. Referring to FIG. 9, a SAW sensor 9050 is bonded to a strain multiplier 9060. The cutting tool 9000 also comprises a tool shank 9010, and a PIFA antenna 9040 disposed on a PCB 9045.

Figure 10:
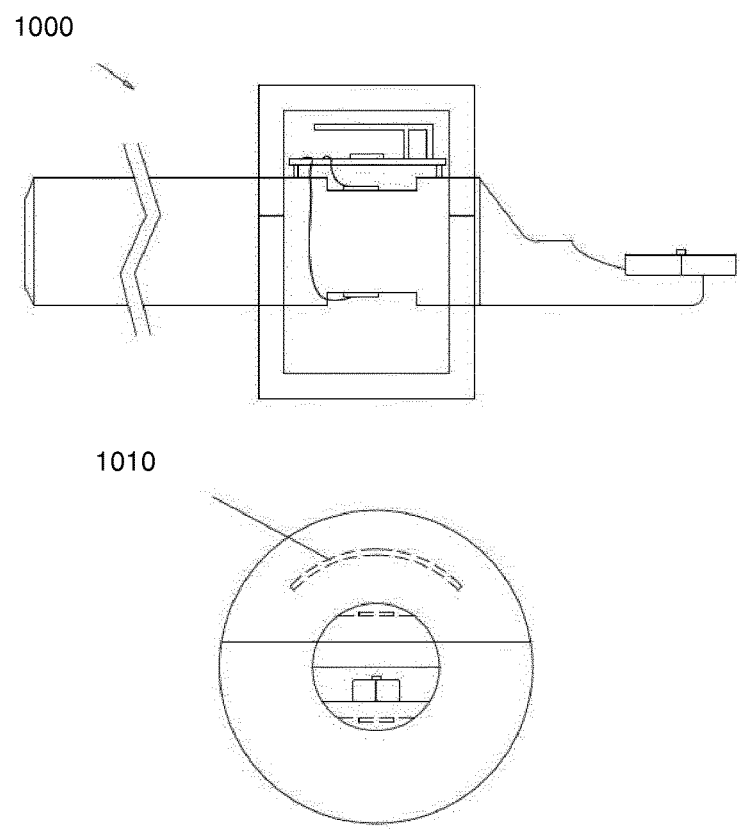
FIG. 10 illustrates an alternative enclosure for different geometry cutting tools, according to an embodiment of the present disclosure.

FIG. 10 illustrates an alternative enclosure 1000 for different geometry cutting tools, according to an embodiment of the present disclosure. Referring to FIG. 10, the enclosure 1000 is a cylindrical enclosure 1000 around a cylindrical shaft with a non-planar PIFA 1010 to match the shaft, or even a planar PIFA.

Figure 11:
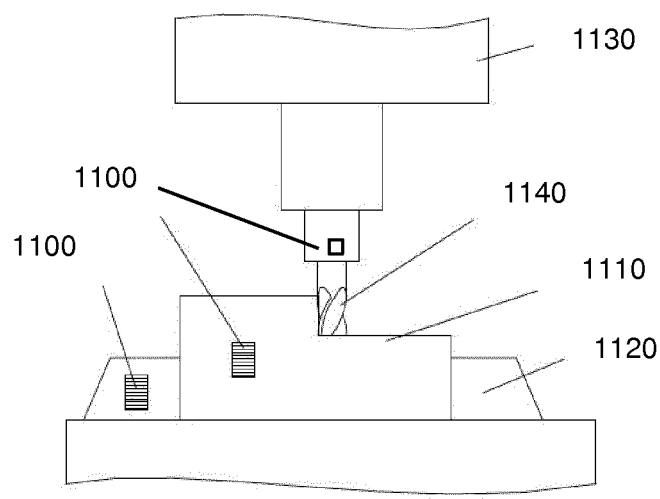
FIG. 11 illustrates a SAW sensor on a workpiece or clamp or toolholder arrangement, according to an embodiment of the present disclosure.
Figure 12A:
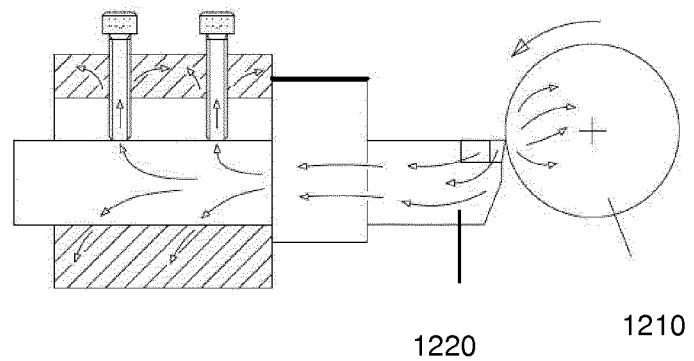
FIG. 12(a) illustrates a turning machine environment and in particular a force path of the forces involved during a turning operation performed on a workpiece by a cutting tool.
Figure 12B:
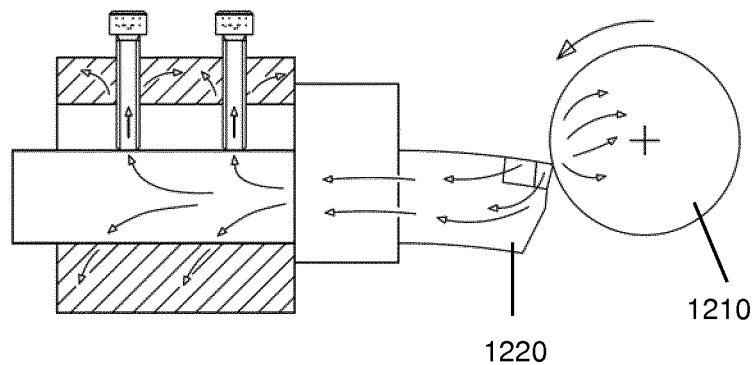
FIG. 12(b) illustrates that the application of the cutting force through the force path results in a bending of the cutting tool/cutting tool holder.
Figure 13:
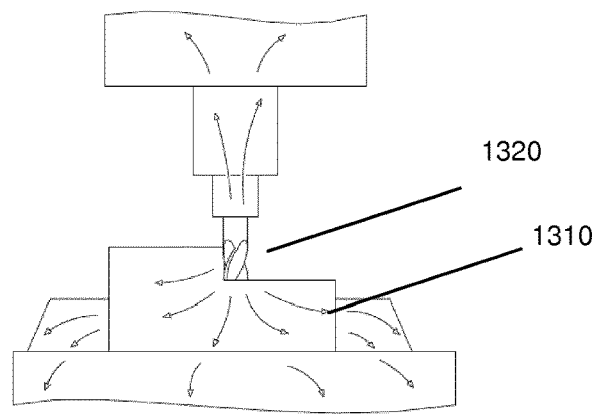
FIG. 13 illustrates a milling machine environment and in particular a force path of the forces involved during a milling operation performed on a workpiece by a cutting tool.

FIG. 11 illustrates a SAW sensor 1100 on a workpiece 1110, clamp 1120 and/or cutting tool 1140, according to an embodiment of the present disclosure. Referring to FIG. 11, the present embodiment involves a milling machine 1130 with the cutting tool 1140. FIG. 12a illustrates a turning machine environment and in particular a force path of the forces involved during a turning operation performed on a workpiece 1210 by a cutting tool 1220. The force path is the route that forces or loads pass through during the manufacturing process. When the tool engages with the workpiece many of the components of the machine tool including the cutting tool, tool holder, workpiece, workpiece holder, machine structure, and machine drive components experience forces and therefore strains (bending and tensile) which can be measured. The force path is normally highly engineered by machine tool designers, cutting tool designers, workholding/clamping system designers in order to have high stiffness and good damping properties to ensure good quality manufacturing processes. Ultimately forces are passed through the machine tool structure and into the foundations which ensure the machine is in a stable configuration. FIG. 12b illustrates that the application of the cutting force through the force path results in a bending of the cutting tool/cutting tool holder. FIG. 13 illustrates a milling machine environment and in particular a force path of the forces involved during a milling operation performed on a workpiece 1310 by a cutting tool 1320. FIG. 13 shows that the workholding arrangment is also part of the force path. FIG. 13 is also analogous for other manufacturing processes.

The present disclosure provides an arrangement for the passive monitoring of strain using SAW transducers. This is useful in an environment where the path and or distance between the at least one interrogation antenna and the at least one receiving antenna may change with time, may contain materials such as fluids, vapours, metal particles, metallic objects or metallic surfaces that can interfere with the electromagnetic signal between the at least one interrogation antennna and the at least one receiving antenna.

In one embodiment, a single PIFA antenna may be provided on the one or more SAW sensors. In the case of multiple SAW sensors, the antennae may be affixed at separate locations on the substrate. The cutting tool body, antenna mounting assembly enclosure influences the resonant frequency of the antenna. The influence of the practical implementation of the at least one receiving antenna on its resonant frequency is accommodated by an antenna tuning circuit. A large conductive layer on a printed circuit board (PCB) may be used as a ground plane for the at least one receiving antenna, the ground plane being electrically connected to an additional metal structure that may include the cutting tool body and/or antenna mounting assembly. The additional metal structure is utilised to extend the total effective size of the antenna ground plane thereby increasing the radiation efficiency of the at least one receiving antenna. The antenna tuning and impedance matching circuit may be implemented and integrated on the antenna PCB. The impedance matching circuit may accommodate each of the one or more SAW sensors. The PCB is optionally directly printed onto the cutting tool shank using printed electronics technology. The mounting methods used for the PCB and antenna may maintain specific spatial relationships between the object under test, the PCB and the antenna.

The PIFA antenna plane may be parallel to the PCB plane. The PCB may be fixed (or printed directly on) to a surface of the object under test, the protective enclosure or the strain multiplier arrangement to maintain the required spatial relationships.

The at least one interrogation antenna may comprise a circularly polarising antenna. The at least one interrogation antenna may have at least one of the following features: a single element micro-strip patch design with circular polarisation, a high antenna gain (typically 4 to 9 dBi) a wide directional beam radiation pattern, and/or a fractional frequency bandwidth of greater than 1.6%

The at least one interrogation antenna may be mounted such that the antenna radiation beam pattern is oriented in the direction of and in line-of-sight of the object under test. The at least one interrogation antenna may be mounted in a fixed location within a machine tool enclosure using a bracket or articulating mounting mechanism. The at least one interrogation antenna may be configured such that the radiation beam pattern of the at least one interrogation antenna overlaps that of the at least one transceiving antenna arrangement for the full range of motion a cutting tool makes relative to the at least one interrogation antenna during a machining operation.

The at least one interrogation antenna assembly may be of a water resistant anti-corrosion design suitable for use in presence of water & oils mists and other contaminants present in a machining environment. The propagation distance between the at least one interrogation antenna and the at least one transceiving antenna arrangement may be configured to be between about 0.1 and about 1.5 metres.

The system of the present disclosure provides for a reduced size, reduced detection range interrogation antenna for sensing configurations where the interrogation antenna moves together with the object under test such that coupling with the transceiving antenna occurs at less than 0.3 metres close to or within the near field of the at least one interrogation antenna.

The at least one interrogation antenna may be mounted on a tool turret or other mechanical assembly that maintains a relative distance between itself and the at least one transceiving antenna arrangement during a machining operation using a selected cutting tool.

The at least one interrogation antenna may be positioned and designed to transmit/receive signals only within a specifically designated zone. Such a specifically designated zone may include the manufacturing zone and specifically exclude any zone which contains tools not in use.

Where multiple objects under test exist, such as in a tool turret, it is desirable that only one transceiving antenna for a selected object under test be within RF range of the interrogation antenna at any one time. This may be achieved by utilising the turret geometry and knowledge of antenna radiation beam characteristics of the object under test or it may be achieved by introducing an antenna 'switching mechanism' on transceiving antennas such that transceiving antennas are 'activated' only when orientated into the cutting zone.

Figure 14A:
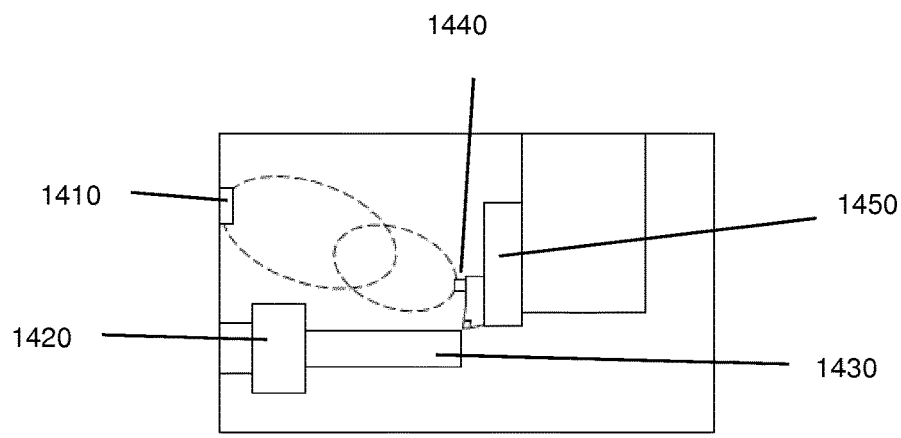
FIGS. 14a to 14c illustrate various configurations of the system according to embodiments of the present disclosure.
Figure 14B:
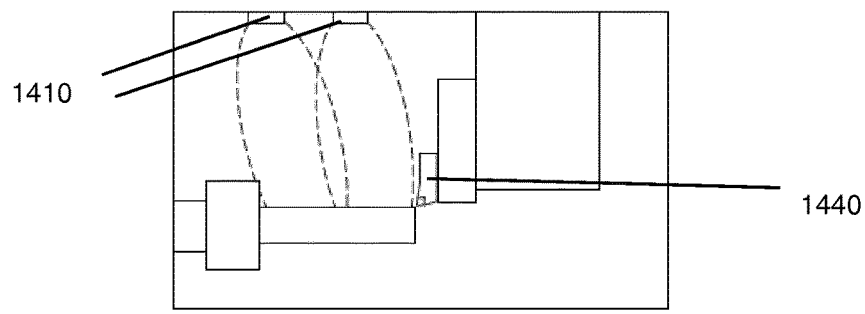
Figure 14C:
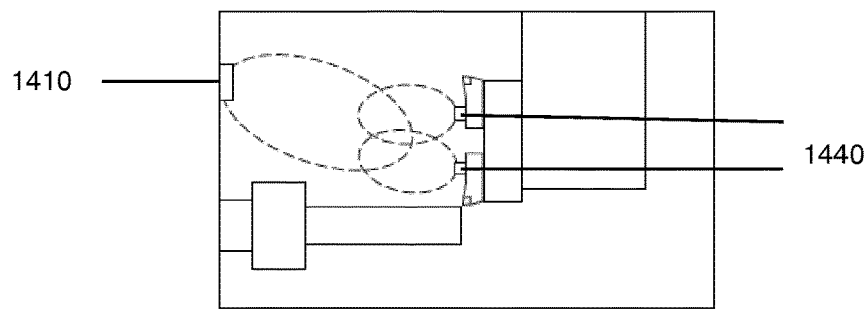

FIGS. 14a to 14c illustrate various configurations of the system according to embodiments of the present disclosure. Referring to FIG. 14a, the system comprises a single interrogation antenna 1410 and a single transceiving antenna 1440. The transceiving antenna 1440 is disposed on a cutting tool on a turret 1450. A chuck 1420 is illustrated holding a workpiece 1430. Referring to FIG. 14b, the system comprises multiple interrogation antennae 1410 and a single transceiving antenna 1440, and FIG. 14c illustrates a system with a single interrogation antenna 1410 and multiple transceiving antennae 1440.

Figure 15:
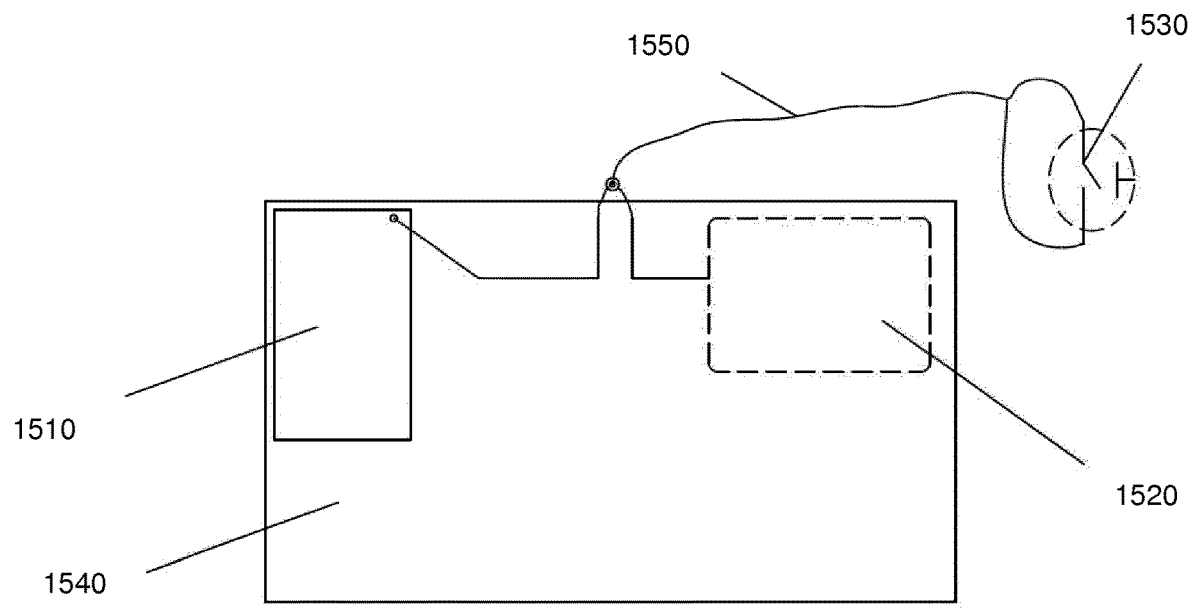
FIG. 15 illustrates a switch for breaking or completing the electrical circuit between a SAW sensor and its transceiving antenna, according to an embodiment of the present disclosure.

Accordingly, the system of the present disclosure may provide a means of breaking or completing the electrical circuit between one of the SAW sensors and its transceiving antenna by activating a switch in response to an environmental factor. That is, the system may comprise one or more SAW sensor transceiving antenna circuits. The concept of an antenna 'switch' to activate and de-activate the antenna based on an environmental parameter is illustrated in FIG. 15, according to an embodiment of the present disclosure. Referring to FIG. 15, a SAW sensor transceiving antenna circuit is illustrated, including a transceiving antenna 1510 on a PCB 1540, and antenna tuning matching circuitry 1520. The system may comprise a switching mechanism for disabling one of the one or more SAW sensor transceiving antenna circuits. This ensures that only selected SAWs can be interrogated. Referring to FIG. 15, a switch 1530 is illustrated along with a cable 1550 leading to the SAW sensor transceiving antenna circuit. The switch 1530 may be activated by application of force or pressure on the switch, an orientation of the switch, a temperature relative to the switch, an exposure of light to the switch, an exposure of a magnetic field i.e. a reed switch mechanism, or a position of a shield relative to the switch—switch (closed) has low insertion and return losses for radio frequency signals. The switch may be based on microelectromechanical systems (MEMS) technology such as an RF switch actuated by electrostatic, electrothermal, or piezoelectric principles. The switch may be positioned on an external portion of a protective enclosure for the object under test, as an integral part of the protective enclosure or as a separate assembly, mounted on the object under test, in such a manner as is convenient for the means of actuation.

The system of the present disclosure may further comprise a strain multiplier arrangement for transferring some or all of the strain from the one or more objects under test to a surface on which the at least one SAW sensor is mounted. An example of such a strain multiplier arrangement is provided in FIG. 9 as described above. The strain multiplier arrangement may be fixed to the one or more objects under test at either end along the axis of the strain to be measured. The strain multiplier arrangement comprises a sensing region comprising a fraction of the length between the fixing points which deforms readily when subject to tensile or compressive forces. A high deformation region may be achieved by the geometric shape of the region (e.g. thinner, narrower). A high deformation region may be achieved by materials properties in the region (lower elastic modulus). The remainder of the region between the fixing points does not readily deform under compressive or tensile forces. The strain multiplication may be adjusted by adjusting the fraction of the length between the fixing points constituting the sensing region. The strain multiplication may be adjusted by adjusting the difference between the materials response to forces in the sensing region and that of the remaining regions between the fixing points. The strain multiplication factor may be greater than, less than or equal to one. The strain multiplication may be designed so as to create alternative means of attachment to the object under test other than adhesive, braze, solder, sintering, or welding, for example, by adding lugs for welding, studs fitting into recesses on the object under test, or bolting to the shaft. The strain multiplier arrangement may act as a means of maintaining chosen spatial relationships between the PCB/the antenna arrangement and the object under test by acting as a mounting surface for the PCB. The PCB may be optionally directly printed onto the strain multiplier surface using printed electronics technology. The strain multiplier arrangement may be so designed to act as an adapter, transferring some or all of the strain from an object under test or position on an object under test which has no suitable flat surface for mounting the SAW sensor. The strain multiplier arrangement may be geometrically designed so as to transfer only a selected component of strain to the flat sensor region. The strain multiplier arrangement may be mounted on a nonplanar shaft (object under test) so as to provide a flat surface on which SAW strain sensors can be mounted to provide a torque sensing arrangement. In another embodiment, the object under test may be adapted by removal of material in the structure in order to allow for the positioning of SAW sensors in a more appropriate force path generating: a more or less intensive strain value, a linear or nonlinear and predicable strain value, a uniaxial strain value, a multiaxial strain value, a temperature sensitive or temperature neutral strain value, or a strain value with higher or lower dynamic bandwidth.

The system of the present disclosure may also comprise a protective enclosure around, any one or combinations of: the PCB; the antennas; the one or more SAWs and the wiring connecting them to bond pads and/or PCB/antenna which are mounted directly or via strain multiplier arrangements onto the object under test. A surface of the object under test forms one (or more) surfaces of the cavity contained within the enclosure. The enclosure may totally or partially encircle/enclose the object under test to form a firmly fixed, fluid-tight enclosure. There may be more than one encapsulating enclosure on a tool (e.g. over SAWs & over PCB/antenna). The enclosure may contain the PCB for tuning the antenna and impedance matching. The enclosure may provide a fluid resistant, protective arrangement for its contents. The protective enclosure may be constructed by 3D printing. A portion of the protective enclosure underneath the antenna PCB, which may support the PCB, may be constructed of material that is resistant to coolant, cutting fluid, in liquid mist or vapour form, and hot chips. Such portion of the protective enclosure may be constructed of a material such as metal that is electrically conductive. The portion of the protective enclosure surrounding the antenna may be constructed of a material that minimally attenuates the electromagnetic signal transmitted or received by the antenna and is resistant to coolant, cutting fluid, in liquid mist or vapour form, and hot chips. The protective enclosure may be positioned to facilitate reproducible mounting of the object under test in a clamping arrangement. Calibration can be carried out on the clamped tool by applying a known force to the tool tip in the direction of the cutting force and measuring the resultant SAW strain sensor output response. Forces may be applied by means of a force gauge, torque wrench, or load testing machine.

The protective enclosure may be designed such that the relative distances of the SAW sensor to the applied load and the sensored object under test are known and form the basis for ensuring absolute measurement is possible. The protective enclosure may be be formed using additive manufacturing processes and can include the antenna with the additive manufacturing process, i.e. an integrated 3D printed antenna and enclosure.

The protective enclosure may be manufactured in one or multiple parts and sealed where it meets the object under test and where two enclosure parts meet using any suitable means to form a firm, fluid resistant seal.

The protective enclosure may be used as a means of assisting reproducible clamping of the object under test in a cantilever arrangement in a holder so that the effective length of the cantilever remains the same length. This allows for off-machine force calibration.

Force measurement via strain measurement is a specific case for an object under test in a cantilever arrangement. The system of the present disclosure may be used for monitoring, optimisation and control of machining (materials removal, materials forming/deforming) operations.

The present disclosure provides a SAW strain sensor module for producing a SAW strain sensor instrumented object under test using elements described in the previous inventive features.

SAW sensor(s) may be mounted directly or indirectly (e.g. via strain multiplier) on an object under test. A PIFA antenna may be mounted on a PCB, which, when affixed to the object under test, fixes the spatial arrangement between the antenna, the PCB and the object under test via its mounting arrangement The entire SAW strain sensor module may be mounted directly to the object under test. Alternatively, the entire SAW strain sensor module may be mounted indirectly to the object under test via the protective enclosure or the strain multiplier. When mounted indirectly, the entire SAW strain sensor module may be manufactured off-tool/object.

The protective enclosure may comprise a single or multiple part protective enclosure designed to partially or completely enclose a selected object under test and to enclose one or any combination of: the strain multiplier arrangement (s), SAW sensor(s), PCB and antenna, and associated wiring. A surface of the object under test may form one (or more) surfaces of the cavity contained within the enclosure.

The protective enclosure, when junctioned between the enclosure parts and the object under test, is sealed, forming a firmly fixed and fluid-tight enclosure around its contents. The protective enclosure when affixed to the object under test creates a means of indexing the object under test in a clamping arrangement for calibration and use, maintaining a constant "overhang" or cantilever length.

An identifier may be provided which uniquely identifies the protective enclosure. The identifier may be a SAW, RFID, bar code, or serial number. The identifier may be inscribed on, attached to, or enclosed within the protective enclosure. The identifier may be remotely read by the at least one interrogation antenna, a RFID reader, or a bar code reader.

The present disclosure may also provide a method of manufacturing and using a SAW-instrumented object under test involving:

assembling the transducer module to the object under test in the appropriate position (i.e. optimised for strain, temperature and indexing the clamping position (the latter sets the position for affixing the protective enclosure)

determining the appropriate parameters for impedance matching SAW sensor(s) to the antenna and for antenna tuning to compensate for the effect of the object under test on the resonant frequency of the antenna, and using these parameters to adjust the appropriate circuits on the PCB, using these parameters on identical modules manufactured for objects under test of the same design;

fitting and sealing the protective enclosure around the object under test;

calibrating the tool using the protective enclosure to index the clamping position, the distance between the indexed clamping position and the cutting tool tip comprising the cantilever length;

using the protective enclosure to similarly index the clamping position when clamped for use (e.g. in a machine tool), thus ensuring that the cantilever length in use is the same as that used for calibration.

The SAW sensor based solution provided by the present disclosure allows for cost-effective instrumentation of standard cutting tool holders & tools in such a way as to enable flexible 'in-process' measurement in a wide range of machining processes that would until now be considered impractical. The instrumented tool(s)/tool holder(s) communicate wirelessly with a remote interrogation system and do not require a battery or wired electrical power source. A single interrogator measurement system can be used with multiple instrumented toolholders/tools. Thus a variety of tooling used in a process may be monitored without significant changes to the measurement setup.

The controllability of the machining process, in particular with respect to structural elements critical for safety is another problem addressed by the system of the present disclosure. Examples from the aerospace industry show that a lack of control and understanding in manufacturing processes can have fatal consequences. In the aerospace industry, in particular, difficult-to-machine materials are being utilised increasingly e.g. Titaniums, Nickel alloys—INC- ONEL, High Purity Aluminium, Super Conducting, Very High Purity Copper, Kovar, Invar and grades of Stainless Steels. Such materials require specialist knowledge and detailed process analysis to provide an efficient and repeatable manufacturing process. The system of the present disclosure can be used for the determination of the machinability of materials, the improvement of tool geometry and coatings, as well as for the qualification of process strategies. Furthermore, this technology can be used to provide improved information for the investigation of chip formation and tool wear. This technology offers the advantage of continuous monitoring in machining for more accurate verification of process simulations and models. The system of the present disclosure can be used to gain insights into the influences of individual process parameters, not only for component manufacturers, but also for ancillary equipment suppliers such as coolant, lubricants, tools and clamping devices.

Precision is of the upmost importance in the Aerospace industry. A single imperfection or faulty component can cause thousands of Euros in damage. Estimates for the cost of reworking or scrapping parts with small distortions in the aerospace industry are in the hundreds of millions of Euros per year. The high cost of not making an airplane part exactly right the first time can be explained by low production volumes over which the high costs of developing new products and ensuring quality are spread. The cost of quality is high because safety and reliability are critical. The cost of developing new parts is also high because trends to minimize weight and optimise performance push the limits of materials and our knowledge of them. A specific case exists in the aerospace industry in the production of thin wall aluminium parts. Vibrations occur in machining operations of thin-walled parts due to the dynamic compliance of the workpiece and excitation by the process. Deformations of thin-walled workpieces result from gravitational and clamping forces, process loads and residual stresses which appear due to the machining process. Parts with slight distortions can be rejected or reworked if they don't fit properly or if they might not be able to bear the loads required of them. Distortions can be especially frequent in parts with thin walls, such as those used in a plane's structural frame. That is because machining creates stress near the surface; for a wall that can be as thin as 0.4 millimetres, most of the wall is near the surface, so distortion often results. To prevent distortions, one solution is to make the part walls thicker; however, the increased weight would reduce aircraft fuel efficiency and performance. A second solution involves painstaking multiple-step machining processes that drive up the cost of machining. The system of the present disclosure as described above offers a better solution to the challenge of reducing part distortions by offering improved insight into the material removal process during manufacturing i.e. by diagnosing tool wear and abnormal cutting forces as they develop during a process, damage to a part can be avoided.

The system of the present disclosure addresses problems specific to the design of a modular passive wireless strain measurement system for cutting force monitoring in cutting tools used within machine tools, for material removal processes. The problems include integration of the necessary strain sensor, antenna(s), printed circuit boards, tuning and impedance matching circuitry and interconnect components within a package; restricted space available for sensor integration on cutting tool; achieving and maintaining good RF communication between sensor system and interrogator system in the challenging propagation environment presented by necessity to operate inside the machine tool enclosure in presence of cutting fluids and chips generated by cutting process, moving parts and while the cutting tool and strain transducer assembly moves relative to the RF interrogator/transceiver; protection of the transducer components from the mechanical damage and environmental contaminants; achieving appropriate signal to noise ratio, sensitivity, and temperature compensation using SAW sensor(s); selective interrogation of selected SAW transducers/strain instrumented cutting tools; and providing a means for off tool/object setup (antenna) and strain/force calibration.

The system of the present disclosure provides a 'smart' cutting tool technology for monitoring cutting forces related to the tool wear or other process conditions. As such the technology will have direct influences on the machining outcomes and manufacturing costs related to these processes. The commercial application of the system of the present disclosure is as a monitoring solution in high value next generation precision machining applications, particularly in the Industry 4.0 context. The trend in modern advanced manufacturing is toward machining components with an ever increasing dimensional/form accuracy and finer surface roughness, even surface functionality requirement. Smart cutting tool technologies are an enabler in understanding and optimising machining processes to cope with machining dynamics, process variations and complexity. For instance, ultra-precision and micro machining, with the surface roughness in the nanometric scale and features/patterns at the micrometer level, is in increasing demand particularly for high precision components need in energy, aerospace, automotive, and construction industries.

Some high value components require machining in a contamination-free environment, which means coolant cannot be applied during the machining process. However, dry cutting condition would lead to tool wear and high cutting temperature, and poor surface quality would thus occur and tool life be shortened. Some materials, such as aluminum and magnesium alloys, are not recommended for applying direct dry-cutting, since the cutting tool is prone to suffering excessive built-up edge (BUE). So for high precision and micro machining, there exists a niche in market for smart cutting tool technologies that can be used to further exploit and understand the cutting mechanics and machining process in coolant free machining applications.

The system of the present disclosure may also comprise a computing device for processing the detected strain response signal, the processing unit being connected to the at least one interrogation antenna, wherein the computing device is arranged to transmit the interrogation signal and transmission energy to the at least one transceiving antenna and to the at least one SAW sensor via the at least one interrogation antenna. The computing device may be arranged to receive the detected strain response signal via the at least one interrogation antenna. The computing device may also be configured to detect the unique digital signature of the object under test. The computing device may be managed by a supervisory processing unit that is integrated to the machine tool control for the purpose of sensored object under test RF channel management.

The computing device may use the detected strain response signal as a quantifiable metric that represents the strain experienced in the force path of the manufacturing process and which can be used as an input to a digital twin for the calculation of process forces during the manufacturing processes. A digital twin is a real time digital replica of a physical device or process derived from sensor information. The digital twin creates a bridge between the physical and digital worlds. The output from the digital twin enables process safety limit settings, in-process optimisation of process forces considering object under test constraints, detection of wear and breakage and prediction of end of life. The wireless and passively detected strain response signal is a digitisation of a quantifiable metric that represents the strain experienced in the force path of the manufacturing process. The digitised signal with the digital twin including metadata related to the system configuration and process parameters enables the absolute quantification of process forces, force directions, force crosstalk and allow temperature to be quantified.

Figure 16:
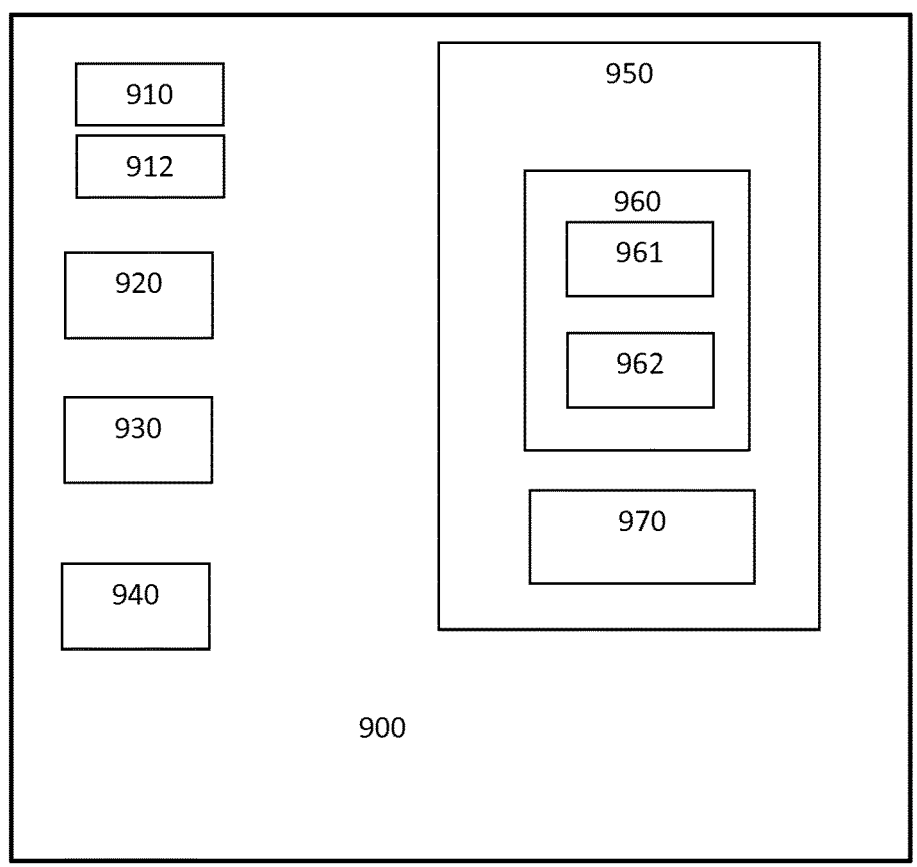
FIG. 16 is a block diagram illustrating a configuration of a computing device which includes various hardware and software components that function to perform processes according to embodiments of the present disclosure.

FIG. 16 is a block diagram illustrating a configuration of a computing device 900 which includes various hardware and software components that function to perform the above-described processes according to the present disclosure. The computing device 900 may be embodied as one of numerous general purpose or special purpose computing system environments or configurations. Examples of well-known computing systems, environments, and/or configurations that may be suitable for use with the present disclosure include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like. Referring to FIG. 16, the computing device 900 comprises a user interface 910, a processor 920 in communication with a memory 950, and a communication interface 930. The processor 920 functions to execute software instructions that can be loaded and stored in the memory 950. The processor 920 may include a number of processors, a multi-processor core, or some other type of processor, depending on the particular implementation. The memory 950 may be accessible by the processor 920, thereby enabling the processor 920 to receive and execute instructions stored on the memory 950. The memory 950 may be, for example, a random access memory (RAM) or any other suitable volatile or non-volatile computer readable storage medium. In addition, the memory 950 may be fixed or removable and may contain one or more components or devices such as a hard drive, a flash memory, a rewritable optical disk, a rewritable magnetic tape, or some combination of the above.

One or more software modules 960 may be encoded in the memory 950. The software modules 960 may comprise one or more software programs or applications having computer program code or a set of instructions configured to be executed by the processor 920. Such computer program code or instructions for carrying out operations for aspects of the systems and methods disclosed herein may be written in any combination of one or more programming languages.

The software modules 960 may include at least a first application 961 and a second application 962 configured to be executed by the processor 920. During execution of the software modules 960, the processor 920 configures the computing device 900 to perform various operations relating to the embodiments of the present disclosure, as has been described above.

Other information and/or data relevant to the operation of the present systems and methods, such as a database 970, may also be stored on the memory 950. The database 970 may contain and/or maintain various data items and elements that are utilized throughout the various operations of the system described above. It should be noted that although the database 970 is depicted as being configured locally to the computing device 900, in certain implementations the database 970 and/or various other data elements stored therein may be located remotely. Such elements may be located on a remote device or server—not shown, and connected to the computing device 900 through a network in a manner known to those skilled in the art, in order to be loaded into a processor and executed.

Further, the program code of the software modules 960 and one or more computer readable storage devices (such as the memory 950) form a computer program product that may be manufactured and/or distributed in accordance with the present disclosure, as is known to those of skill in the art.

The communication interface 940 is also operatively connected to the processor 920 and may be any interface that enables communication between the computing device 900 and other devices, machines and/or elements. The communication interface 940 is configured for transmitting and/or receiving data. For example, the communication interface 940 may include but is not limited to a Bluetooth, or cellular transceiver, a satellite communication transmitter/receiver, an optical port and/or any other such, interfaces for wirelessly connecting the computing device 900 to the other devices.

The user interface 910 is also operatively connected to the processor 920. The user interface may comprise one or more input device(s) such as switch(es), button(s), key(s), and a touchscreen.

The user interface 910 functions to facilitate the capture of commands from the user such as an on-off commands or settings related to operation of the system described above. The user interface 910 may function to issue remote instantaneous instructions on images received via a non-local image capture mechanism.

A display 912 may also be operatively connected to the processor 920. The display 912 may include a screen or any other such presentation device that enables the user to view various options, parameters, and results. The display 912 may be a digital display such as an LED display. The user interface 910 and the display 912 may be integrated into a touch screen display.

The computing device 900 may reside on a remote cloud-based computer. Accordingly, the software adapted to implement the system and methods of the present disclosure can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualised resources. Cloud computing providers deliver applications via the Internet, which can be accessed from a web browser, while the business software and data are stored on servers at a remote location. In the cloud embodiment of the computing device 900, the software modules 960 and processor 920 may be remotely located on the cloud-based computer.

The operation of the computing device 900 and the various elements and components described above will be understood by those skilled in the art with reference to the method and system according to the present disclosure.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly the words comprises/comprising when used in the specification are used to specify the presence of stated features, integers, steps or components but do not preclude the presence or addition of one or more additional features, integers, steps, components or groups thereof.

The invention claimed is:

1. A sensing system for wireless and passive monitoring of strain during a manufacturing process that depends on force to apply the energy into the manufacturing process, the sensing system comprising:
   at least one surface acoustic wave, SAW, sensor for detecting strain, the at least one SAW sensor being positioned in a force path located on or in the structure of one or more objects under test; and
   at least one transceiving antenna arrangement being connectable to the at least one SAW sensor,
   at least one interrogation antenna for providing an interrogation signal, wherein the at least one transceiving antenna arrangement is arranged for wireless communication with the at least one interrogation antenna,
   wherein the at least one SAW sensor and the at least one transceiving antenna arrangement are arranged to receive energy from the interrogation signal and output a strain response signal detected by the at least one SAW sensor in response to the interrogation signal, and
   wherein the at least one interrogation antenna is positioned to transmit/receive signals only within a specifically designated zone including a manufacturing process zone and specifically excluding any zone which contains tools not in use.

2. The system of claim 1, wherein the at least one transceiving antenna arrangement comprises a radiating element and a conductive layer on a printed circuit board, PCB, acting as a ground plane for the radiating element.

3. The system of claim 2, wherein the conductive layer is electrically connected to a collocated additional metal structure for extending a total effective size of the ground plane, the collocated additional metal structure comprising the one or more objects under test.

4. The system of claim 2, wherein the radiating element has a planar design and is mounted a fixed distance above the ground plane such that antenna radiation is directed away from the ground plane.

5. The system of claim 1, wherein the at least one transceiving antenna arrangement comprises a low profile antenna configured for transmission and reception of RF signals in the UHF band.

6. The system of claim 5, wherein the UHF band comprises the 434 MHz ISM band.

7. The system of claim 1, wherein the at least one transceiving antenna arrangement comprises a Planar inverted F antenna, PIFA.

8. The system of claim 1, comprising one or more SAW sensor transceiving antenna circuits, and further comprising a switch mechanism for activating or deactivating one or more of the one or more SAW sensor transceiving antenna circuits.

9. The system of claim 8, wherein the switch mechanism comprises an environmentally actuated RF switch.

10. The system of claim 8, wherein the switch mechanism comprises application of mechanical force or pressure on a switch, an orientation of the switch, exposure of light, temperature or magnetic field to the switch, or the use of microelectromechanical systems, MEMS, technology.

11. The system of claim 1, wherein the at least one interrogation antenna comprises a single interrogation antenna.

12. The system of claim 1, wherein the at least one interrogation antenna comprises a multi-antenna array comprising at least two interrogation antennae.

13. The system of claim 12, wherein the multi-antenna array has antenna spacing less than half-wavelength and antenna elements arranged to form a 1 or 2 dimensional antenna array.

14. The system of claim 12, wherein the multi-antenna array is configured to create a radiation pattern with increased directivity and antenna gain in a given direction.

15. The system of claim 12, wherein the multi-antenna array comprises a plurality of mutually spaced antennas of the same construction, each of the antennas being connected to a separate physical channel of the at least one transceiving antenna, whereby only one transceiving antenna interrogation antenna pairing is used for communications at a time.

16. The system of claim 15, being configured to select the transceiving antenna interrogation antenna pairing that delivers the strongest SAW sensor return signal.

17. The system of claim 1, wherein the at least one interrogation antenna comprises at least one of (i) a circularly polarised patch antenna, (ii) a reconfigurable directional RF beam adapted for the application environment, and (iii) an optimisation algorithm for tuning the at least one interrogation antenna to the application environment.

18. The system of claim 17, wherein the optimisation algorithm is configured for tuning the resonance frequency and/or RF transmit power level of the at least one interrogation antenna.

19. The system of claim 1, wherein the at least one SAW sensor is disposed on the one or more objects under test.

20. The system of claim 19, wherein the at least one SAW sensor comprises two or more SAW sensors.

21. The system of claim 20, wherein the two or more SAW sensors are configured for sensing a differential strain measurement, wherein a first SAW sensor is arranged to be mounted on a first surface of the one or more objects under test and a second SAW sensor is arranged to be mounted on a second surface of the one or more objects under test.

22. The system of claim 21, wherein the first and second SAW sensors are arranged to be mounted in a direction of bending strain.

23. The system of claim 1, wherein each of the one or more objects under test has a unique identity, wherein the SAW sensor and transceiving antenna coupling combination for each object under test together generate a unique digital signature which forms the basis for the unique identity.

24. The system of claim 23, wherein the SAW sensor is collocated with an RFID tag sharing a multiband antenna on each of the one or more objects under test.

25. The system of claim 1, wherein the one or more objects under test comprise at least one of a cutting tool, workpiece, and workholding device.

26. The system of claim 1, wherein the manufacturing processes comprise material removal processes comprising machining of a workpiece, grinding, broaching; surface deformation processes comprising burnishing, knurling and impact peening, shaping processes comprising spinning and roll forming, forming processes comprising incremental forming, and joining processes comprising friction stir processes, friction welding, as well as vibration and ultrasonic assistance of the aforementioned manufacturing processes.

27. The system of claim 1, wherein the at least one SAW sensor and the at least one transceiving antenna arrangement are contained within a protective enclosure.

28. A sensing system for wireless and passive monitoring of strain during a manufacturing process that depends on force to apply the energy into the manufacturing process, the sensing system comprising:
- at least one surface acoustic wave, SAW, sensor for detecting strain, the at least one SAW sensor being positioned in a force path located on or in the structure of one or more objects under test; and
- at least one transceiving antenna arrangement being connectable to the at least one SAW sensor,
- wherein the at least one SAW sensor and the at least one transceiving antenna arrangement are arranged to receive energy from an interrogation signal and output a strain response signal detected by the at least one SAW sensor in response to the interrogation signal, and
- further comprising a strain multiplier arrangement arranged to be mounted on the one or more objects under test, the strain multiplier configured for transferring strain from the one or more objects under test to a surface on which the at least one SAW sensor is mounted.

29. The system of claim 28, wherein the strain multiplier arrangement is fixed to the one or more objects under test at either end along the axis of the strain to be measured.

30. The system of claim 29, wherein the strain multiplier arrangement comprises a sensing region comprising a fraction of the length between the fixing points which deforms readily when subject to tensile or compressive forces.

31. The sensing system of claim 28 wherein the at least one SAW sensor and the at least one transceiving antenna arrangement are contained within a protective enclosure.

32. A sensing system for wireless and passive monitoring of strain during a manufacturing process that depends on force to apply the energy into the manufacturing process, the sensing system comprising:
- at least one surface acoustic wave, SAW, sensor for detecting strain, the at least one SAW sensor being positioned in a force path located on or in the structure of one or more objects under test;
- at least one transceiving antenna arrangement being connectable to the at least one SAW sensor; and
- a modular reconfigurable protective enclosure configured to partially or completely enclose a selected object under test of the one or more objects under test;
- wherein the at least one SAW sensor and the at least one transceiving antenna arrangement are arranged to receive energy from an interrogation signal and output a strain response signal detected by the at least one SAW sensor in response to the interrogation signal.

33. The system of claim 32, wherein the protective enclosure is positionable to facilitate reproducible mounting of an object under test in a clamping arrangement.

34. A sensing system for wireless and passive monitoring of strain during a manufacturing process that depends on force to apply the energy into the manufacturing process, the sensing system comprising:
- at least one surface acoustic wave, SAW, sensor for detecting strain, the at least one SAW sensor being positioned in a force path located on or in the structure of one or more objects under test; and
- at least one transceiving antenna arrangement being connectable to the at least one SAW sensor,
- wherein the at least one SAW sensor and the at least one transceiving antenna arrangement are arranged to receive energy from an interrogation signal and output a strain response signal detected by the at least one SAW sensor in response to the interrogation signal, and
- a computing device for processing the detected strain response signal, the processing unit being connected to the at least one interrogation antenna, wherein the computing device is arranged to transmit the interrogation signal and transmission energy to the at least one transceiving antenna and to the at least one SAW sensor via the at least one interrogation antenna, and
- wherein the computing device is arranged to receive the detected strain response signal via the at least one interrogation antenna,
- wherein the computing device uses the detected strain response signal as a quantifiable metric that represents the strain experienced in the force path of the manufacturing process and which can be used as an input to a digital twin for the calculation of process forces during the manufacturing processes.

35. The system of claim 34, wherein the output from the digital twin enables process safety limit settings, in-process optimisation of process forces considering object under test constraints, detection of wear and breakage and prediction of end of life.

36. The sensing system of claim 34 wherein the at least one SAW sensor and the at least one transceiving antenna arrangement are contained within a protective enclosure.

* * * * *